(12) United States Patent
Tan et al.

(10) Patent No.: US 11,458,797 B2
(45) Date of Patent: Oct. 4, 2022

(54) THERMAL MANAGEMENT SYSTEM

(71) Applicant: Zhejiang Sanhua Intelligent Controls Co., Ltd., Zhejiang (CN)

(72) Inventors: Yongxiang Tan, Zhejiang (CN); Keli Ye, Zhejiang (CN)

(73) Assignee: Zhejiang Sanhua Intelligent Controls Co., Ltd., Zhejiang (CN)

(*) Notice: Subject to any disclaimer, the term of this patent is extended or adjusted under 35 U.S.C. 154(b) by 268 days.

(21) Appl. No.: 16/621,201

(22) PCT Filed: Jun. 21, 2018

(86) PCT No.: PCT/CN2018/092133
§ 371 (c)(1),
(2) Date: Dec. 10, 2019

(87) PCT Pub. No.: WO2019/001330
PCT Pub. Date: Jan. 3, 2019

(65) Prior Publication Data
US 2020/0108690 A1    Apr. 9, 2020

(30) Foreign Application Priority Data
Jun. 27, 2017    (CN) .......................... 201710499039.6

(51) Int. Cl.
*B60H 1/00*    (2006.01)
*H01M 10/613*    (2014.01)
(Continued)

(52) U.S. Cl.
CPC ........... *B60H 1/00278* (2013.01); *B60H 1/00* (2013.01); *B60H 3/024* (2013.01);
(Continued)

(58) Field of Classification Search
CPC .. B60H 1/00; B60H 1/00278; B60H 1/00921; B60H 1/143; B60H 1/2221;
(Continued)

(56) References Cited

U.S. PATENT DOCUMENTS 9,515,357 B2    12/2016 Haskins et al.
9,758,012 B2 *    9/2017 Johnston ............ B60H 1/00921
(Continued)

FOREIGN PATENT DOCUMENTS

CN    102452297 A    5/2012
CN    103253149 A    8/2013
(Continued)

OTHER PUBLICATIONS

CN 105835653A Machine Translation (Year: 2016).*
(Continued)

*Primary Examiner* — Len Tran
*Assistant Examiner* — Gustavo A Hincapie Serna
(74) *Attorney, Agent, or Firm* — Wolf, Greenfield & Sacks, P.C.

(57) ABSTRACT

A thermal management system, the thermal management system having a coolant system, wherein the coolant system includes a battery circuit and a heating/cooling circuit; a second flow channel of a first heat exchanger, a battery heat exchanger, and a first pump form a part of the battery circuit, while a heater, a radiator, and a second pump form a part of the heating/cooling circuit; a first valve device turns on or blocks the battery circuit and the heating/cooling circuit; the coolant system comprises a connection portion, and the connection portion turns on or blocks the battery circuit and the heating/cooling circuit.

10 Claims, 11 Drawing Sheets

(51) Int. Cl.
| | |
|---|---|
| *H01M 10/615* | (2014.01) |
| *H01M 10/625* | (2014.01) |
| *H01M 10/6556* | (2014.01) |
| *H01M 10/6568* | (2014.01) |
| *H01M 10/663* | (2014.01) |
| *B60H 3/02* | (2006.01) |

(52) U.S. Cl.
CPC ....... *H01M 10/613* (2015.04); *H01M 10/615* (2015.04); *H01M 10/625* (2015.04); *H01M 10/6556* (2015.04); *H01M 10/6568* (2015.04); *H01M 10/663* (2015.04); *H01M 2220/20* (2013.01)

(58) Field of Classification Search
CPC .. B60H 1/3222; B60H 1/32284; B60H 1/323; B60H 3/024; B60H 2001/00307; B60H 2001/00928; B60H 2001/00935; B60H 2001/00949; H01M 10/613; H01M 10/615; H01M 10/625; H01M 10/6556; H01M 10/6568; H01M 10/663; H01M 2220/20; F25B 2313/0231; F25B 2313/003; F25B 2313/02343; F25B 2313/02344; F25B 2313/02791; F25B 25/005; Y02E 60/10; Y02T 10/70
USPC ......................................................... 165/202
See application file for complete search history.

(56) References Cited

U.S. PATENT DOCUMENTS

| | | | | |
|---|---|---|---|---|
| 9,950,638 | B2* | 4/2018 | Porras | B60H 1/00921 |
| 10,603,978 | B2* | 3/2020 | Sawyer | B60H 1/00564 |
| 11,207,941 | B2* | 12/2021 | Lee | B60H 1/00342 |
| 2010/0012295 | A1* | 1/2010 | Nemesh | H01M 10/663 |
| | | | | 165/104.19 |
| 2012/0222446 | A1* | 9/2012 | Sekiya | B60H 1/00385 |
| | | | | 62/498 |
| 2013/0166119 | A1 | 6/2013 | Kummer et al. | |
| 2013/0206360 | A1 | 8/2013 | Zhang et al. | |
| 2014/0041826 | A1* | 2/2014 | Takeuchi | B60L 1/08 |
| | | | | 165/10 |
| 2014/0298838 | A1* | 10/2014 | Morishita | B60H 1/00921 |
| | | | | 62/151 |
| 2014/0352341 | A1* | 12/2014 | Hamamoto | B60H 1/321 |
| | | | | 62/278 |
| 2015/0273976 | A1* | 10/2015 | Enomoto | B60L 3/0046 |
| | | | | 62/243 |
| 2015/0330351 | A1* | 11/2015 | Ragazzi | F02M 31/16 |
| | | | | 903/902 |
| 2016/0107505 | A1* | 4/2016 | Johnston | B60H 1/00914 |
| | | | | 165/202 |
| 2016/0153343 | A1* | 6/2016 | Kakehashi | B60H 1/3228 |
| | | | | 123/41.31 |
| 2017/0001493 | A1* | 1/2017 | Graaf | H01M 10/625 |
| 2017/0021695 | A1* | 1/2017 | Durrani | B60H 1/00921 |
| 2017/0021698 | A1* | 1/2017 | Hatakeyama | F25B 25/005 |
| 2017/0054188 | A1* | 2/2017 | Blatchley | H01M 10/613 |
| 2017/0217288 | A1* | 8/2017 | Suzuki | B60H 1/00921 |
| 2018/0201094 | A1 | 7/2018 | Kawano et al. | |
| 2018/0345758 | A1* | 12/2018 | Oh | B60H 1/00385 |
| 2018/0354342 | A1* | 12/2018 | Miyakoshi | B60H 1/3213 |
| 2020/0047583 | A1* | 2/2020 | Ishizeki | F25B 41/39 |
| 2020/0122544 | A1* | 4/2020 | Ishizeki | B60H 1/323 |

FOREIGN PATENT DOCUMENTS

| | | | |
|---|---|---|---|
| CN | 103358851 A | | 10/2013 |
| CN | 105835653 A | * | 8/2016 |
| CN | 105835653 A | | 8/2016 |
| CN | 206141270 U | | 5/2017 |
| DE | 10 2012 223 054 A1 | | 6/2013 |
| EP | 1 115 169 A2 | | 7/2001 |
| EP | 1 115 169 A3 | | 12/2006 |
| EP | 2 977 254 A1 | | 1/2016 |
| WO | WO 2017/010289 A1 | | 1/2017 |

OTHER PUBLICATIONS

Extended European Search Report for European Application No. 18825009.6, dated Feb. 12, 2021.
PCT/CN2018/092133, Sep. 6, 2018, International Search Report and Written Opinion.
International Search Report and Written Opinion for International Application No. PCT/CN2018/092133, dated Sep. 6, 2018.
CN201710499039.6, Mar. 17, 2020, First Office Action.
First Office Action for Chinese Application No. 201710499039.6, dated Mar. 17, 2020.

* cited by examiner

THERMAL MANAGEMENT SYSTEM

This application is a national stage filing under 35 U.S.C. § 371 of International Patent Application Serial No. PCT/CN2018/092133, filed Jun. 21, 2018, which claims priority to Chinese Patent Application No. 201710499039.6, titled "THERMAL MANAGEMENT SYSTEM", filed on Jun. 27, 2017 with the National Intellectual Property Administration, PRC, the contents of these applications are incorporated herein by reference in their entireties.

FIELD

The present application relates to the technical field of thermal management for a vehicle.

BACKGROUND

An electric vehicle and a hybrid vehicle at present are provided with a battery cooling system, which is used for cooling a battery of the vehicle frequently since the battery is easy to overheat in use. However, in a particular situation, for example, when the circumstance temperature is low, charging and discharging efficiency and a lifespan of the battery may be low. Therefore, an urgent problem to be solved at present is how to improve charging and discharging efficiency of a battery.

SUMMARY

An object of the present application is to provide a thermal management system, which makes a battery keep high charging and discharging efficiency under different circumstance temperatures, improve a lifespan of the battery and achieve a quick charging.

To realize the above object, a technical solution is provided as follows.

A thermal management system includes a battery heat exchanger, a first pump, a second pump, a first heat exchanger, a heater, a radiator and a first valve device;

the first heat exchanger includes a first flow channel and a second flow channel, the first flow channel and the second flow channel are isolated mutually, heat is exchangeable between a liquid in the first flow channel and a liquid in the second flow channel;

the thermal management system includes a refrigerant system and a cooling liquid system, and the refrigerant system includes the first flow channel of the first heat exchanger, the cooling liquid system includes the second flow channel of the first heat exchanger, the battery heat exchanger, the first pump, the second pump, the heater, the first valve device and the radiator;

the cooling liquid system includes a battery loop and a heating/cooling loop, the second flow channel of the first heat exchanger, the battery heat exchanger and the first pump form a part of the battery loop, where the heater, the radiator and the second pump form a part of the heating/cooling loop, and the first valve device is configured to conduct or block a passway between the battery loop and the heating/cooling loop;

the cooling liquid system includes a connecting portion, and the connecting portion is configured to conduct or block the passway between the battery loop and the heating/cooling loop.

To realize the above object, another technical solution is provided as follows.

A thermal management system, including a battery heat exchanger, a first pump, a second pump, a first heat exchanger, a heater, a radiator, a second valve device and a second heat exchanger;

both the first heat exchanger and the second heat exchanger include two flow channels, and a first flow channel of the first heat exchanger and a second flow channel of the first heat exchanger are isolated mutually, heat is exchangeable between a liquid in the first flow channel of the first heat exchanger and a liquid in the second flow channel of the first heat exchanger, a first flow channel of the second heat exchanger and a second flow channel of the second heat exchanger are isolated mutually, heat is exchangeable between a liquid in the first flow channel of the second heat exchanger and a liquid in the second flow channel of the second heat exchanger;

the thermal management system includes a refrigerant system and a cooling liquid system, the refrigerant system includes the first flow channel of the first heat exchanger, the cooling liquid system includes the second flow channel of the first heat exchanger, the battery heat exchanger, the first pump, the second pump, the heater, the second valve device, the second heat exchanger and the radiator;

the cooling liquid system includes a battery loop and a heating/cooling loop, the heating/cooling loop is coupled with the battery loop, the first flow channel of the second heat exchanger, the second flow channel of the first heat exchanger, the battery heat exchanger and the first pump form a part of the battery loop, the second flow channel of the second heat exchanger, the heater, the radiator, the second valve device and the second pump form a part of the heating/cooling loop.

In the above technical solutions, the cooling liquid system includes the battery loop and the heating/cooling loop, in which the heating/cooling loop is coupled with the battery loop. Thus, the battery is heated through the cooling/heating loop when the battery is in a low temperature, and dissipates the heat through the refrigerant system and the cooling/heating loop when the battery is in a high temperature. Therefore, the battery may have a high level of charging and discharging efficiency at both high and low temperatures, which is beneficial to lengthen a lifespan of the battery.

BRIEF DESCRIPTION OF THE DRAWINGS

In order to more clearly illustrate technical solutions in embodiments of the present application or in the conventional technology, drawings used in the description of the embodiments or the conventional technology are introduced briefly hereinafter. Apparently, the drawings described in the following illustrate some embodiments of the present application, other drawings may be obtained by those ordinarily skilled in the art based on these drawings without any creative efforts.

DETAILED DESCRIPTION OF EMBODIMENTS

Figure 1:
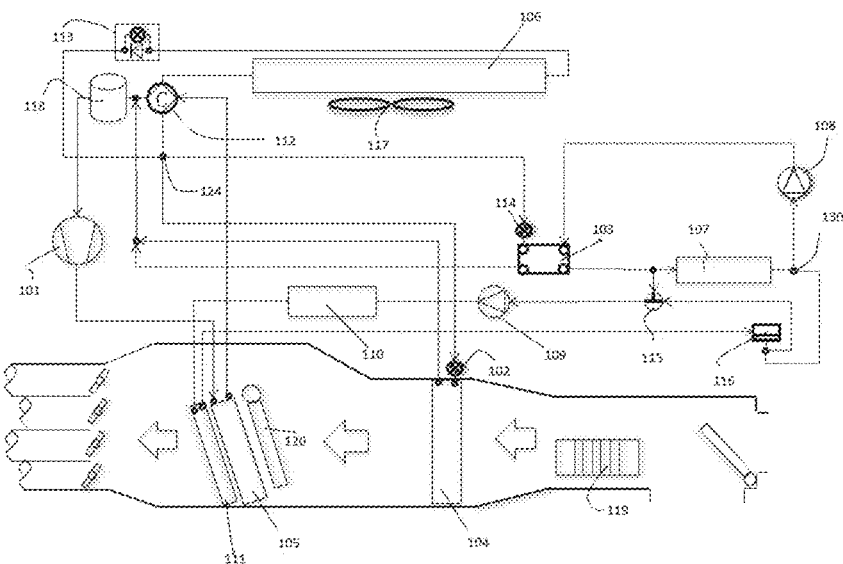
FIG. 1 is a schematic diagram of a thermal management system according to an embodiment of the present application.
Figure 2:
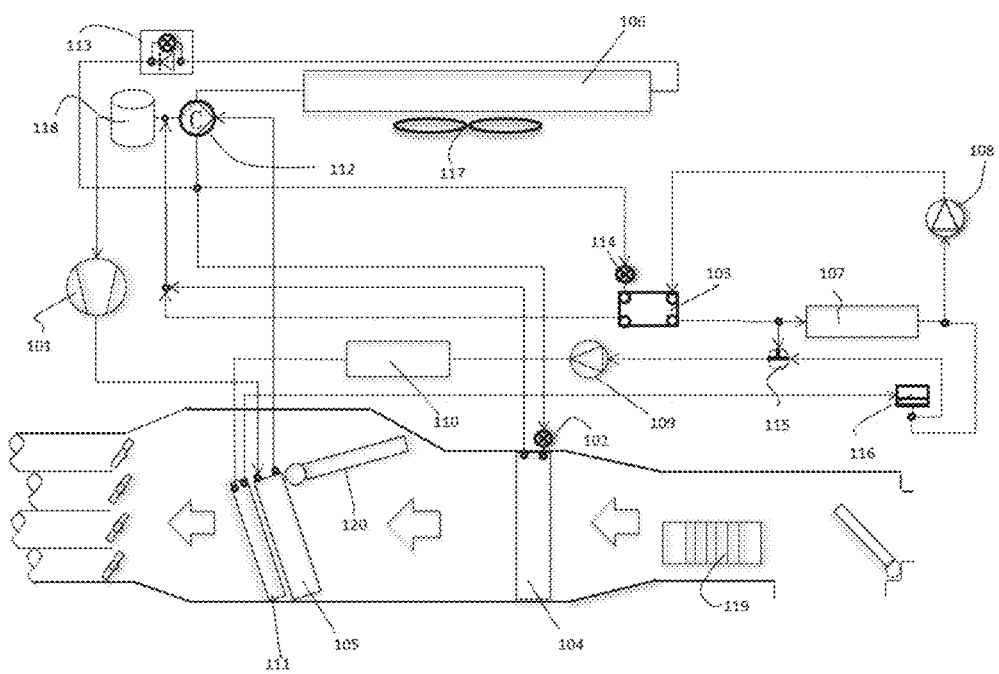
FIGS. 2-13 are schematic diagrams illustrating different working modes of the thermal management system as shown in FIG. 1.

To make the person skilled in the art better understand the technical solutions of the present application, the present application will be described clearly and completely hereinafter in conjunction with the drawings and detailed implementations.

Referring to FIGS. 1-13, FIGS. 1-13 show a thermal management system according to an embodiment of the present application. A thermal management system, includes a refrigerant system and a cooling liquid system. A refrigerant in the refrigerant system and a cooling liquid in the cooling liquid system are isolated mutually; the thermal management system includes a first heat exchanger 103 having two flow channels, heat is exchangeable between a liquid in a first flow channel of the first heat exchanger 103 and a liquid in a second flow channel of the first heat exchanger 103 in the first heat exchanger; the refrigerant system includes the first flow channel of the first heat exchanger 103, and the cooling liquid system includes the second flow channel of the first heat exchanger 103.

The cooling liquid system includes a battery heat exchanger 107, a first pump 108, the second flow channel of the first heat exchanger 103, a first valve device 115, a second pump 109, a heater 110 and a radiator 111. The thermal management system includes an air conditioning box. The heater 110 is arranged outside the air conditioning box and the radiator 111 is arranged inside the air conditioning box, so as to prevent electricity from entering the air conditioning box and to reduce security risks. Compared to a device with an electric heater, the radiator is simple and compact in structure, thus a structure of the air conditioning box is also compact. The radiator has a low wind resistance, thus, air flowing through the radiator is still in a great volume. The cooling liquid system includes a battery loop and a heating/cooling loop. The battery loop includes the second flow channel of the first heat exchanger 103, the battery heat exchanger 107 and the first pump 108. The second flow channel of the first heat exchanger 103, the battery heat exchanger 107 and the first pump 108 form a part of the battery loop. The heating/cooling loop includes the second pump 109, the heater 110 and the radiator 111. The second pump 109, the heater 110 and the radiator 111 form a part of the heating/cooling loop. The cooling liquid system includes a first valve device 115. The first valve device 115 includes three communication ports, that is, a first communication port 115a of the first valve device, a second communication port 115b of the first valve device and a third communication port 115c of the first valve device. The first communication port 115a of the first valve device is configured to be in communication with the battery loop. The second communication port 115b of the first valve device and the third communication port 115c of the first valve device are in communication with heating/cooling loop. A liquid pressure at the second communication port 115b of the first valve device is less than a liquid pressure at the first communication port 115a of the first valve device and the third communication port 115c of the first valve device. The first communication port 115a of the first valve device may be connected with a pipeline before the battery heat exchanger 107, and may also be connected with a pipeline before the first pump 108 or a pipeline before the second flow channel of the first heat exchanger 103.

In the present application, the expression "connected with" or "in communication with" means that one component is directly connected with or in communication with another component, or indirectly connected with or in communication with another component through a part. Additionally, a connection order between parts is not limited. For example, a connection order of the second flow channel of the first heat exchanger 103, the battery heat exchanger 107 and the first pump 108 is not limited. That is, the second flow channel of the first heat exchanger 103, the battery heat exchanger 107 and the first pump 108 may be connected one after another. Also, the second flow channel of the first heat exchanger 103, the first pump 108 and the battery heat exchanger 107 may be connected one after another, and so forth.

The cooling liquid system includes a connecting portion 130 (see FIG. 1). The connecting portion 130 is configured to connect to the heating/cooling loop and the battery loop. The connecting portion may be a three-way pipe or a three-way valve. Specifically, the connecting portion includes a valve. The valve includes three communication ports, that is, a first connecting port of the valve, a second connecting port of the valve and a third connecting port of the valve. At least one of the three communication ports is located in the battery loop, and at least one of the three communication ports is located in the heating/cooling loop. The valve may control flow quantity of the first connecting port of the valve, the second connecting port of the valve and the third connecting port of the valve. Or, the connecting portion includes a three-way component. The three-way component includes three communication ports, that is, a first connecting port of the three-way component, a second connecting port of the three-way component and a third connecting port of the three-way component. At least one of the three communication ports is located in the battery loop, and at least one of the three communication ports is located in the heating/cooling loop.

The cooling liquid system includes a first circulation mode, a second circulation mode and a third circulation mode. In the first circulation mode, the first valve device is in a first working state, that is, the first communication port of the first valve device and the second communication port of the first valve device are conducted, and the second communication port of the first valve device and the third communication port of the first valve device are conducted. The heater is switched on. The battery loop and the third communication port of the first valve device are conducted by the connecting portion. A part of a cooling liquid in the battery loop flows into the heating/cooling loop through the first communication port of the first valve device and the second communication port of the first valve device, and then flows into the radiator after being heated by the heater. A cooling liquid in the heating/cooling loop dissipates heat to ambient air through the radiator. A part of a cooling liquid at an outlet of the radiator flows into the battery loop through the connecting portion, and dissipates heat in the battery heat exchanger. Another part of the cooling liquid at the outlet of the radiator returns back through the third communication port of the first valve device. In the second circulation mode, the first valve device is in the first working state, that is, the first communication port of the first valve device and the second communication port of the first valve device are conducted, and the second communication port of the first valve device and the third communication port of the first valve device are conducted. The heater is switched off. The battery loop and the third communication port of the first valve device are conducted by the connecting portion. A part of the cooling liquid in the battery loop flows into the heating/cooling loop through the first communication port of the first valve device and the second communication port of the first valve device, and dissipates heat to ambient air through the radiator. A part of the cooling liquid at the outlet of the radiator flows into the battery loop through the connecting portion, and absorbs heat in the battery heat exchanger. Another part of the cooling liquid at the outlet of the radiator returns back through the third communication port of the first valve device. In the third circulation mode, the first valve device is in a second working state, that is, the first communication port of the first valve device and the second communication port of the first valve device are not conducted, and the battery loop and the heating/cooling loop are not conducted.

The cooling liquid system has functions of cooling a battery, heating a battery and heating a passenger compartment. The first communication port 115a of the first valve device is in communication with the battery loop. A part of a cooling liquid in the battery loop flows into the heating/cooling loop through the first communication port 115a of the first valve device, the part of the cooling liquid in the heating/cooling loop flows into the radiator after being heated by the heater, and the radiator dissipates heat to a passenger compartment. Thus, the function of heating is realized. A part of the cooling liquid in the heating/cooling loop returns back to the battery loop, which is used for heating the battery. By adjusting the first valve device, flow quantity of a cooling liquid flowing into the second communication port 115b of the first valve device from the first communication port 115a of the first valve device is controlled, thus, the requirement for heating the passenger compartment is met and a temperature of the battery is proper.

When the battery does not require for heating, the cooling liquid system may achieve the function of heating a passenger compartment. The first communication port 115a of the first valve device is not in communication with the battery loop, the cooling liquid in the heating/cooling loop flows into the radiator after being heated by the heater, and the radiator dissipates heat to the passenger compartment, which realizes the function of heating the passenger compartment.

When the battery requires for cooling, the first pump 108 is switched on, and the cooling liquid is circulated in the battery loop. A fluid in the first flow channel of the first heat exchanger 103 absorbs heat from a fluid in the second flow channel of the first heat exchanger 103, and a temperature of the cooling liquid in the battery loop is reduced. A cooled liquid cools a device such as the battery and so on in the battery heat exchanger 107, to realize the function of cooling the battery.

Figures 19, 20:
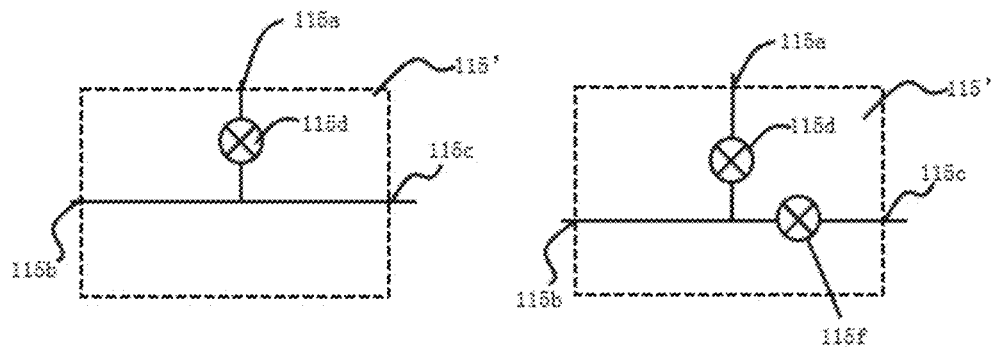
FIG. 19 is a schematic diagram of a first valve device according to an embodiment of the present application.
FIG. 20 is a schematic diagram of a first valve device according to an embodiment of the present application.

The first valve device may be a three-way proportional valve. The first valve device may adjust flow quantity of a cooling liquid flowing to the second communication port of the first valve device from the first communication port of the first valve device, or adjust flow quantity of a cooling liquid flowing into the battery loop, or adjust flow quantity of a cooling liquid flowing into the heating/cooling loop. In another implementation, as shown in FIG. 19, the first valve device 115' includes a first valve module 115d having two end ports. A first end port of the first valve module 115d may be connected with the first communication port 115a, and a second end port of the first valve module 115d may be connected with the second communication port 115b and the third communication port 115c. The first valve module 115d is configured to block or conduct or adjust a fluid flowing to the second end port of the first valve module 115d from the first communication port 115a. When the first valve device is in the first working state, the first valve module 115d is switched on. When the first valve device is in the second working state, the first valve module 115d is switched off. In another implementation, as shown in FIG. 20, the first valve device 115" includes a first valve module 115d and a second valve module 115f. The first valve module 115d includes two end ports, and the second valve module 115f also includes two end ports. A first end port of the first valve module 115d is in communication with the first communication port 115a. A first end port of the second valve module 115f is in communication with the third communication port 115c of the first valve device. A second end port of the first valve module 115d and a second end port of the second valve module 115f are in communication with the second communication port 115b of the first valve device. The first valve module 115d is configured to block or conduct or adjust a fluid flowing to the second end port of the first valve module from the first communication port 115a of the first valve device. The second valve module 115f is configured to adjust flow quantity of a fluid flowing to the second end port of the second valve module 115f from the third communication port 115c of the first valve device. When the first valve device is in the first working state, the first valve module 115d is switched on. When the first valve device is in the second working state, the first valve module 115d is switched off, and the second valve module 115f is switched on. The first valve module and the second valve module may be a module has functions of adjusting flow quantity of a fluid and stopping a fluid, such as a flow control valve with a stopping function.

The cooling liquid system may further include a kettle 116. An installation height of the kettle 116 is higher than that of the battery heat exchanger, the first pump, the second pump, the first heat exchanger, the heater, the radiator and the first valve device. The kettle 116 may eliminate air in the cooling liquid system after being connected with the cooling liquid system.

In a specific implementation, the first valve device 115 is a three-way proportional valve. The second communication port 115b is in communication with an inlet of the second pump 109. An outlet of the second pump 109 is in communication with the heater 110. The heater 110 is in communication with an inlet of the radiator 111. An outlet of the radiator 111 is in communication with the kettle 116. An outlet of the kettle 116 has two paths, one path is in communication with the third communication port 115c and another path is in communication with an inlet of the first pump 108. An outlet of the first pump 108 is in communication with an inlet of the second flow channel of the first heat exchanger 103. An outlet of the second flow channel of the first heat exchanger 103 has two paths, one path is in communication with an inlet of the battery heat exchanger 107, and another path is in communication with the first communication port 115a. An outlet of the battery heat exchanger 107 is connected to the inlet of the first pump 108.

In another specific implementation, the first communication port 115a of the first valve device 115 is in communication with the battery loop, the second communication port 115b of the first valve device 115 is in communication with the heating/cooling loop, and the third communication port 115c of the first valve device 115 is in communication with the battery loop.

Figure 14:
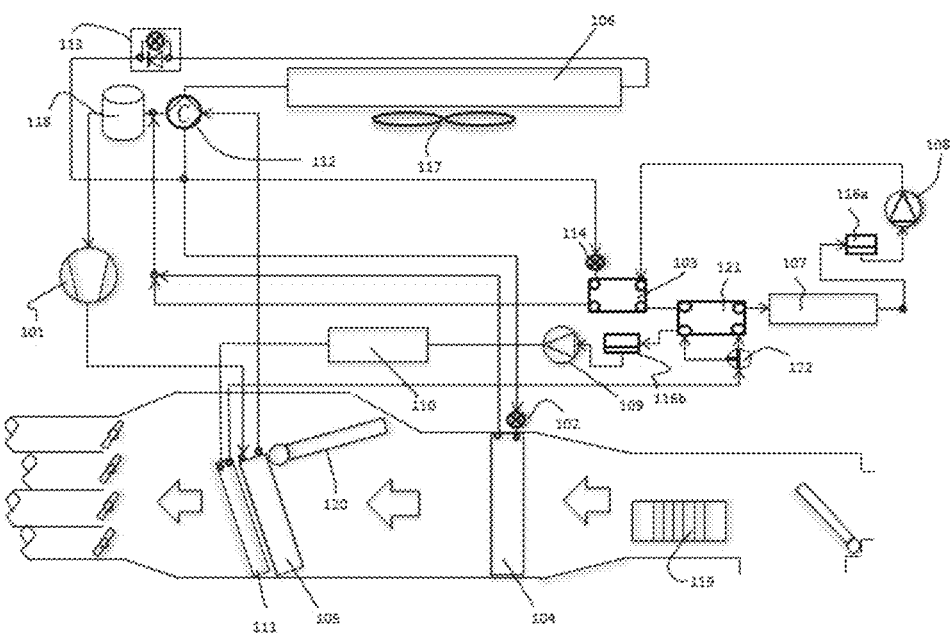
FIG. 14 is a schematic diagram of a thermal management system according to an embodiment of the present application.

In another implementation, referring to FIG. 14, FIG. 14 shows a thermal management system according to an embodiment of the present application. The thermal management system includes a second heat exchanger 121. The second heat exchanger 121 includes two flow channels, that is, a first flow channel of the second heat exchanger 121 and a second flow channel of the second heat exchanger 121. A heat exchange process occurs in the second heat exchanger 121 between a liquid in the first flow channel of the second heat exchanger 121 and a liquid in the second flow channel of the second heat exchanger 121. The cooling liquid system includes a battery loop and a heating/cooling loop. The battery loop includes the second flow channel of the first heat exchanger 103, a battery heat exchanger 107, a first pump 108 and the first flow channel of the second heat exchanger 121. That is, the second flow channel of the first heat exchanger 103, the battery heat exchanger 107, the first pump 108 and the first flow channel of the second heat exchanger 121 form a part of the battery loop. The heating/cooling loop includes a second pump 109, a heater 110, a radiator 111 and the second flow channel of the second heat exchanger 121. That is, the second pump 109, the heater 110, the radiator 111 and the second flow channel of the second heat exchanger 121 form a part of the heating/cooling loop.

Figures 21, 22:
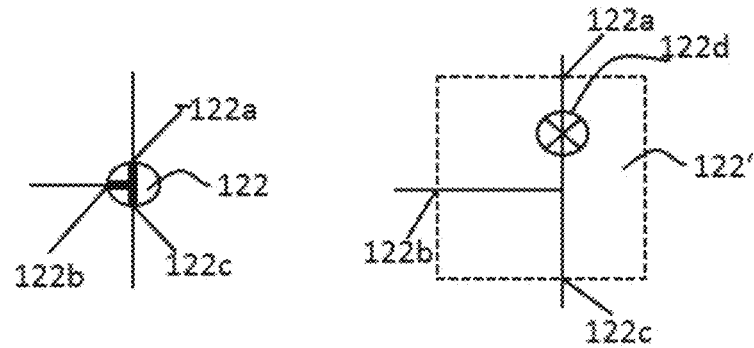
FIG. 21 is a schematic diagram of a second valve device according to an embodiment of the present application.
FIG. 22 is a schematic diagram of a second valve device according to an embodiment of the present application.

The heating/cooling loop includes a second valve device 122, referring to FIG. 21, the second valve device 122 includes at least a first communication port 122a, a second communication port 122b and a third communication port 122c. The first communication port of the second valve device 122 is in communication with the second flow channel of the second heat exchanger. The second communication port of the second valve device 122 is in communication with an outlet or an outlet pipe of the second flow channel of the second heat exchanger. The third communication port of the second valve device 122 is in communication with the radiator 111. The third communication port of the second valve device 122 is configured to conduct or block the first communication port and the second communication port of the second valve device. The second valve device may be a three-way proportional valve, and is able to adjust flow quantity of a cooling fluid flowing to the first communication port from the third connecting port.

In another implementation, referring to FIG. 22, the second valve device 122' includes at least a first valve module 122d having two end ports. A first end port of the first valve module 122d is in communication with the first communication port 122a. A second end port of the first valve module 122d is in communication with the second communication port 122b and the third communication port 122c. The first valve module 122d is able to block or conduct or adjust a fluid flowing to the second end port of the first valve module 122d from the third communication port. The second valve device includes a first working state and a second working state. When the second valve device is in the first working state, the first valve module 122d is switched off, and when the second valve device is in the second working state, the first valve module 122d is switched on.

The cooling liquid system includes a first circulation mode, a second circulation mode and a third circulation mode. The second valve device 122 includes a first working state and a second working state. When the second valve device is in the first working state, the third communication port 122c of the second valve device 122 and the first communication port 122a of the second valve device 122 are conducted, and the third communication port 122c of the second valve device 122 and the second communication port 122b of the second valve device 122 are conducted. When the second valve device is in the second working state, the third communication port 122c of the second valve device 122 and the first communication port 122a of the second valve device 122 are not conducted, and the third communication port 122c of the second valve device 122 and the second communication port 122b of the second valve device 122 are conducted.

In the first circulation mode, the second valve device 122 is in the first working state, the third communication port 122c and the first communication port 122a are conducted by the second valve device 122, and the third communication port 122c and the second communication port 122b are conducted by the second valve device 122. The heater 110 is switched on, and a ventilation door 120 near the radiator 111 is open. In the second circulation mode, the second valve device 122 is in the second working state, the third communication port 122c and the first communication port 122a are blocked by the second valve device 122, the heater 110 is switched on, and the ventilation door 120 near the radiator is open. In the third circulation mode, the second valve device 122 is in the first working state, the third communication port 122c and the first communication port 122a are conducted by the second valve device 122, the heater 110 is switched off, and the ventilation door 120 near the radiator 111 is open.

Figures 23, 24:
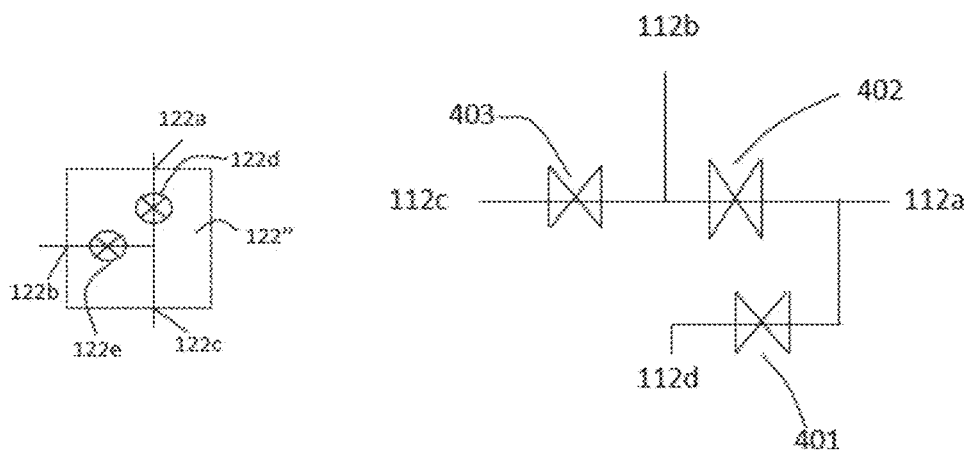
FIG. 23 is a schematic diagram of a second valve device according to an embodiment of the present application.
FIG. 24 is a schematic diagram of a third valve device according to an embodiment of the present application.

Referring to FIG. 23, a second valve device 122" includes a first valve module 122d and a second valve module 122e. The first valve module 122d and the second valve module 122e both include two end ports. A first end port of the first valve module 122d is in communication with the first communication port 122a. A first end port of the second valve module 122e is in communication with the second communication port 122b. A second end port of the first valve module 122d and a second end port of the second valve module 122e are both connected with the third communication port 122c. In the first working state, the first valve module 122d is switched off, and the second valve module 122e is switched on. In the second working state, the first valve module 122d is switched on, and the second valve module 122e is switched on. The first valve module and the second valve module may be a module with functions of adjusting and stopping flow quantity of a fluid, such as a flow control valve with a stopping function.

The second valve device 122 adjusts flow quantity of a refrigerant flowing to the second flow channel of the second heat exchanger, so as to control an amount of heat exchange between the refrigerant in the second flow channel of the second heat exchanger and a refrigerant in the first flow channel of the second heat exchanger, and further to control heating efficiency of the battery heat exchanger.

In this embodiment, the heater is located outside an air conditioning box, and the radiator is located inside the air conditioning box, so as to prevent electricity from entering the air conditioning box and to reduce security risks. Compared to a device with an electric heater, the radiator is simple and compact in structure, thus a structure of the air conditioning box is also compact. The radiator has a low wind resistance, and air flowing through the radiator is still in a great volume.

The heating/cooling loop includes a kettle 116b, and the battery loop includes a kettle 116a. The kettle 116a and 116b are used for venting in the heating/cooling loop. An installation height of the kettle 116a is greater than that of the first heat exchanger, the battery heat exchanger, the first pump and the second heat exchanger. An installation height of the kettle 116b is greater than that of the second heat exchanger, the heater, the radiator, the second valve device and the second pump. Both the heating/cooling loop and the battery loop are arranged with a kettle, which helps to exclude bubbles generated in a working process.

When the battery does not require for heating, the cooling liquid system may realize the function of heating a passenger compartment. The second pump 109 is switched on, the fluid is circulated within the heating/cooling loop, which realizes the function of heating external air through the radiator.

When the passenger compartment does not require for heating, the cooling liquid system may realize the function of heating a battery. The first pump 108 is switched on and the second pump 109 is switched on. The fluid flows into the second flow channel of the second heat exchanger 121 through the radiator 111 and the second valve device 122 after being heated by the heater 110. The fluid in the first flow channel of the second heat exchanger absorbs heat from the fluid in the second flow channel of the second heat exchanger. The temperature of the battery may be proper by adjustment of the first pump 108.

When the battery requires for cooling, the first pump 108 is switched on, and the cooling liquid is circulated within the battery loop. The fluid in the first flow channel of the first heat exchanger 103 absorbs heat from the fluid in the second flow channel of the first heat exchanger 103. The temperature of the cooling liquid in the battery loop is cooled. The temperature of the battery may be proper.

In an implementation, an outlet of the first pump 108 is in communication with an inlet of the second flow channel of the first heat exchanger 103. An outlet of the second flow channel of the first heat exchanger 103 is in communication with an inlet of the first flow channel of the second heat exchanger 121. An outlet of the second flow channel of the second heat exchanger 121 is in communication with an inlet of the battery heat exchanger 107. An outlet of the battery heat exchanger 107 is in communication with an inlet of the kettle 116a. An outlet of the kettle 116a is in communication with an inlet of the first pump 108. The outlet of the second flow channel of the second heat exchanger 121 is in communication with an inlet of the kettle 116b. An outlet of the kettle 116b is in communication with an inlet of the second pump 109. An outlet of the second pump 109 is in communication with an inlet of the heater 110. An outlet of the heater 110 is in communication with an inlet of the radiator 111. An outlet of the radiator 111 is in communication with the third communication port 122c of the second valve device 122. The first communication port 122a is in communication with the inlet of the kettle 122a. The second communication port 122b is in communication with the inlet of the second flow channel of the second heat exchanger 121.

Figure 3:
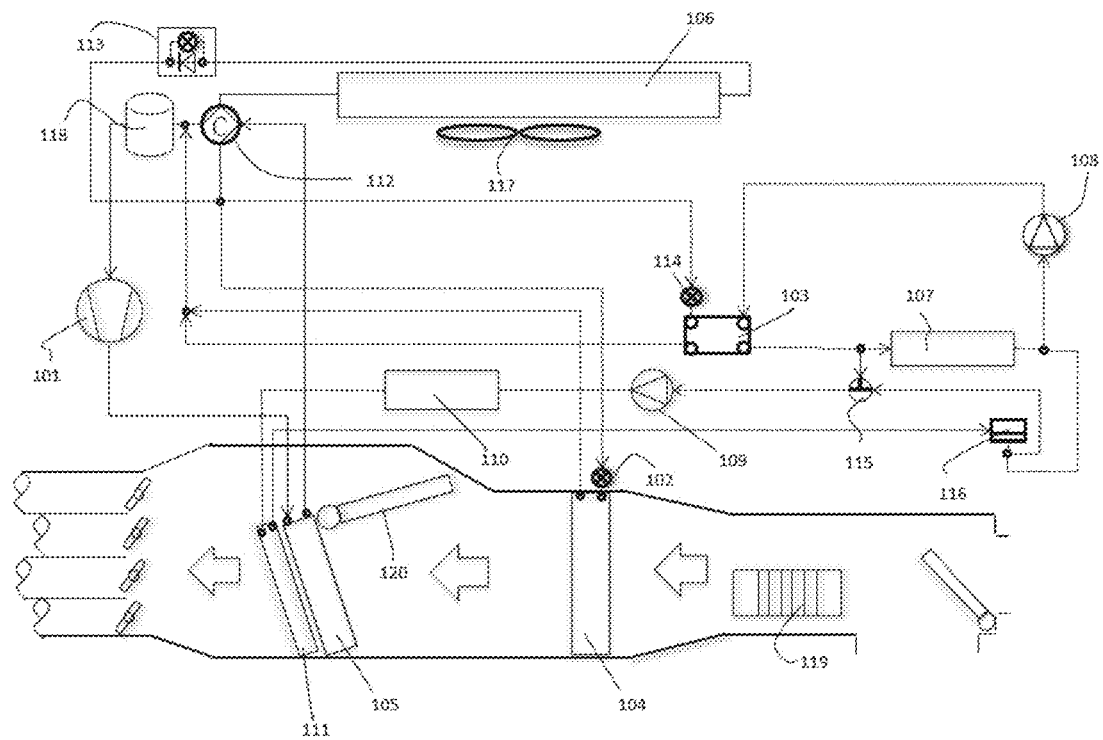

Referring to FIG. 3, the refrigerant system includes a compressor 101, a first throttling device 102, a flow channel of a first heat exchanger 103, a fifth heat exchanger 104, a third heat exchanger 105, a third valve device 112, a fourth valve device 113, a second throttling device 114 and a fourth heat exchanger 106.

The third valve device 112 includes four end ports, that is, a first communication port 112a of the third valve device, a second communication port 112b of the third valve device, a third communication port 112c of the third valve device and a fourth communication port 112d of the third valve device. The fourth gear valve 113 includes two end ports, that is, a first communication port 113a of the fourth valve device and a second communication port 113b of the fourth valve device. An outlet of the compressor 101 is in communication with an inlet of the third heat exchanger 105. An outlet of the third heat exchanger 105 is in communication with the first communication port 112a of the third valve device. The second communication port 112b of the third valve device is in communication with one end port of fourth heat exchanger 106. Another end port of the fourth heat exchanger 106 is in communication with the first communication port 113a of the fourth valve device 113. The second communication port 113b of the fourth valve device 113 is in communication with the fourth communication port 112d of the third valve device 112, or the second throttling device 114, or the first throttling device 102. The third communication port 112c of the third valve device is in communication with an inlet of the compressor 101. The fourth communication port 112d of the third valve device is in communication with the first throttling device 102, the second throttling device 114 and the fourth valve device 113.

Figures 25, 26:
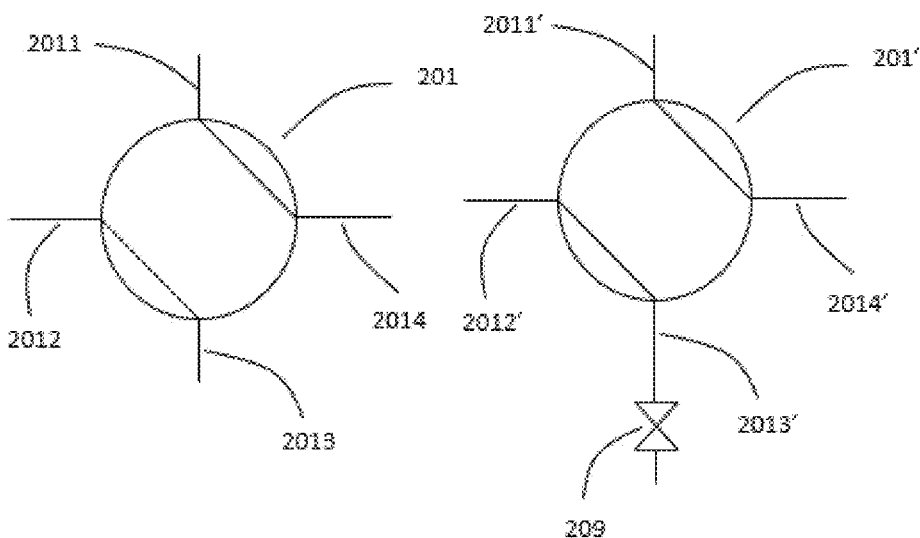
FIG. 25 is a schematic diagram of a third valve device according to an embodiment of the present application.
FIG. 26 is a schematic diagram of a third valve device according to an embodiment of the present application.

The third valve device 112 includes at least a first working state and a second working state. In the first working state of the third valve device 112, the first communication port 112a and the second communication port 112b are conducted, and the fourth communication port 112d and the third communication port 112c are not conducted. In the second working state of the third valve device 112, the first communication port 112a and the fourth communication port 112 are conducted, and the second communication port 112b and the third communication port 112c are conducted. Referring to FIG. 25, the third valve device 112 of the thermal management system may be a first multi-way reversing device 201. The first multi-way reversing device 201 may include a first valve hole 2011, a second valve hole 2012, a third valve hole 2013 and a first inlet 2014. Or, the first multi-way reversing device 201 may include a first connecting pipe connected with the first valve hole, a second connecting pipe connected with the second valve hole, a third connecting pipe connected with the third valve hole, and a fourth connecting pipe connected with the first inlet 2014. The first inlet 2014 is in communication with the first communication port 112a. The first valve hole 2011 is in communication with the second communication port 112b. The second valve hole 2012 is in communication with the third communication port 112c. The third valve hole 2013 is in communication with the fourth communication port 112d. In the first working state of the third valve device, the first multi-way reversing device 201 may conduct a passway between the first inlet 2014 and the first valve hole 2011, and close a passway between the third valve hole 2013 and the second valve hole 2012. In the second working state of the third valve device, the first multi-way reversing device 201 may conduct a passway between the first inlet 2014 and the third valve hole 2013, and conduct a passway between the first valve hole 2011 and the second valve hole 2012.

In another implementation, referring to FIG. 26, the third valve device may include a second multi-way reversing device 201' and a first valve 209. The second multi-way reversing device 201' includes a second inlet 2014', a fourth valve hole 2011', a fifth valve hole 2012' and a sixth valve hole 2013'. Similarly, the second multi-way reversing device 201' may further include connecting pipes connected with each valve hole or inlet. Two end ports of the first valve 209 is in communication with the sixth valve hole 2013' and the fourth communication port 112d respectively. The second inlet 2014' is in communication with the first communication port 112a. The fourth valve hole 2011' is in communication with the second communication port 112b. The fifth valve hole 2012' is in communication with the third communication port 112c. In the first working state of the third valve device, the second multi-way reversing device 201' conduct a passway between the second inlet 2014' and the fourth valve hole 2011', conduct a passway between the sixth valve hole 2013' and the fifth valve hole 2012', and close the first valve 209. In the second working state of the third valve device, the second multi-way reversing device 201' conduct a passway between the fourth valve hole 2011' and the fifth valve hole 2012', conduct a passway between the sixth valve hole 2013' and the second inlet 2014', and conduct the first valve 209. The first valve 209 may be a stopping valve, a flow control valve or a one-way valve. In a case that the first valve 209 is a one-way valve, a direction of the refrigerant flowing into the sixth valve hole 2013' is stopped by the one-way valve, and a direction of the refrigerant flowing out of the sixth valve hole 2013' is conducted by the one-way valve.

Referring to FIG. 24, with reference to the other implementation of the thermal management system, the third valve device 112 may include a first valve module 401, a second valve module 402 and a third valve module 403. The first valve module 401, the second valve module 402 and the third valve module 403 may be a stopping valve or a two-way flow control valve. The first valve module 401, the second valve module 402 and the third valve module 403 include two end ports. A first end port of the first valve module 401 and a first end port of the second valve module 402 are both connected with the fourth communication port 112d. A second end port of the first valve module 401 is in communication with the first communication port 112a. A second end port of the second valve module 402 and a second end port of the third valve module 403 are in communication with the second communication port 112b. The third valve module 403 is in communication with the third communication port 112c. In the first working state of the third valve device, the second valve module 402 is switched on, while the first valve module 401 and the third valve module 403 are switched off. In the second working state of the third valve device, the first valve module 401 is switched on, the third valve module 403 is switched on, and the second valve module 402 is switched off. In another implementation, the first valve module 401 and the second valve module 402 may be replaced by a first three-way valve (not shown in figure). The first three-way valve may include three communication ports. A first connecting port of the first three-way valve is in communication with the fourth communication port 112d. A second connecting port of the first three-way valve and the second end port of the third valve module 403 are both connected with the second communication port 112b. The third valve module is in communication with the third communication port 112c. A third connecting port of the first three-way valve is in communication with the first communication port 112a. In a first working state of the third valve device, the three-way valve conducts a passway between the first connecting port of the first three-way valve and the second connecting port of the first three-way valve, and closes a passway between the first connecting port of the first three-way valve and the third connecting port of the first three-way valve, and a third stopping valve is closed. In the second working state of the third valve device, the first three-way valve conducts a passway between the first connecting port of the first three-way valve and the third connecting port of the first three-way valve, and the third valve module is open. The first three-way valve closes a passway between the first connecting port of the first three-way valve and the second connecting port of the first three-way valve. The first connecting port of the first three-way valve is in communication with an outlet of the refrigerant of the first heat exchanger 103. The second connecting port of the first three-way valve is in communication with a first end port of the fifth heat exchanger 104. The third connecting port of the first three-way valve is in communication with an inlet of the second heat exchanger 121, the first flow channel of the fourth heat exchanger 106 and the second end port of the fifth heat exchanger 104, or connected with an inlet of the second heat exchanger 121, the first flow channel of the fourth heat exchanger 106 and the second end port of the fifth heat exchanger 104 through a four-way valve.

The thermal management system includes a gas-liquid separator 118. The gas-liquid separator 118 is in communication with an inlet of the compressor. When the refrigerant may be in gas-liquid two phase, the gas-liquid separator is arranged, so as to separate a gas-liquid two-phase refrigerant. A liquid refrigerant is stored in the gas-liquid separator, and a gas refrigerant enters the compressor 101. If the compressor may accept a liquid refrigerant, the gas-liquid separator 118 may be unnecessary. The gas-liquid separator 118 may be replaced by a liquid receiver. If the refrigerant is not a two-phase flow, the gas-liquid separator may be unnecessary.

The fourth valve device 113 includes a throttling structure unit 113c and a one-way structure unit 113d. The one-way structure unit 113d conducts a passway between first communication port 113a of the fourth valve device 113 and the second communication port 113b of the fourth valve device 113. The throttling structure unit 113c conducts a passway between the second communication port 113b of the fourth valve device 113 and the first communication port 113a of fourth valve device 113. The fourth valve device 113 may be an electronic expansion valve having a one-way valve, or a combination of some other throttling device and a one-way valve, or a pipe connecting structure.

The first throttling device 102 and the second throttling device 114 may be a thermal expansion valve, or an electronic expansion valve, or a throttling device that may adjust a refrigerant passing through such as a capillary. The one-way structure unit 113d may be a stopping valve, a flow control valve or an electromagnetic valve having a function of stopping and controlling, and may also be a one-way valve which is conductive in one direction and unavailable in another direction. The throttling device may be integrated with a heat exchanger, so as to form an assembly in a compact structure, for example, an assembly by integrated the second throttling device 114 with the first heat exchanger 103.

The refrigerant system includes a four-way structure 124 (see FIG. 1). The four-way structure 114 includes four end ports. A first end port of the four-way structure 124 is in communication with the second throttling device 114. A second end port of the four-way structure 124 is in communication with the fourth communication port 112*d*. A third end port of the four-way structure 124 is in communication with the second communication port 113*b* of the fourth valve device 113. A fourth end port of the four-way structure 124 is in communication with the first throttling device 102.

The thermal management system may include an air conditioning box (not shown in figure). The air conditioning box includes an air conditioning body arranged with multiple air ducts that are connected to inside of the vehicle. The third heat exchanger 105 is arranged inside the air conditioning box. A fan 119 is arranged near an air vent of the air conditioning box. A ventilation door 120 is arranged at a windward side of the third heat exchanger 105. Flowing of the air surrounding the third heat exchanger 105 is controlled by adjusting the ventilation door 120.

The thermal management system includes a heating mode, a cooling mode, a dehumidification mode and a circulation mode. Working conditions of the thermal management system under the above modes are illustrated hereinafter. The heating mode of the thermal management system includes a first heating mode, a second heating mode and a third heating mode. The thermal management system is in the first heating mode if merely the heater is used for heating. In the first heating mode, in a case that the compressor and the battery loop are not switched on, referring to FIG. 11, the second pump 109 is switched on, the heater 110 is switched on, and the battery loop and the heating/cooling loop are not conducted. A cooling liquid in the heating/cooling loop flows into the radiator 111 after being heated by the heater 110, and dissipates heat to external air in the radiator 111 when the ventilation door 120 opens. In a case that the battery loop is switched on, referring to FIG. 7*a*, the first pump 108 and the second pump 109 are switched on, and flow quantity of the first valve device 115 is adjusted. A part of a cooling liquid in the battery loop flows into the second pump 109 through the first communication port 115*a* and the second communication port 115*b*. Since the heater 110 is not switched on, the cooling liquid flows into the radiator 111 through the heater 110, and dissipates heat to air when the ventilation door 120 opens. The fan 119 is switched on, and warm air in the passenger compartment exhausts to outside by means of external circulation. A part of the cooled cooling liquid is pumped into the battery loop by the first pump 108, and is used for cooling the battery in the battery heat exchanger 107. Another part of the cooled cooling liquid returns back to the second pump 109 through the second communication port 114*c*, and so on.

Figure 10:
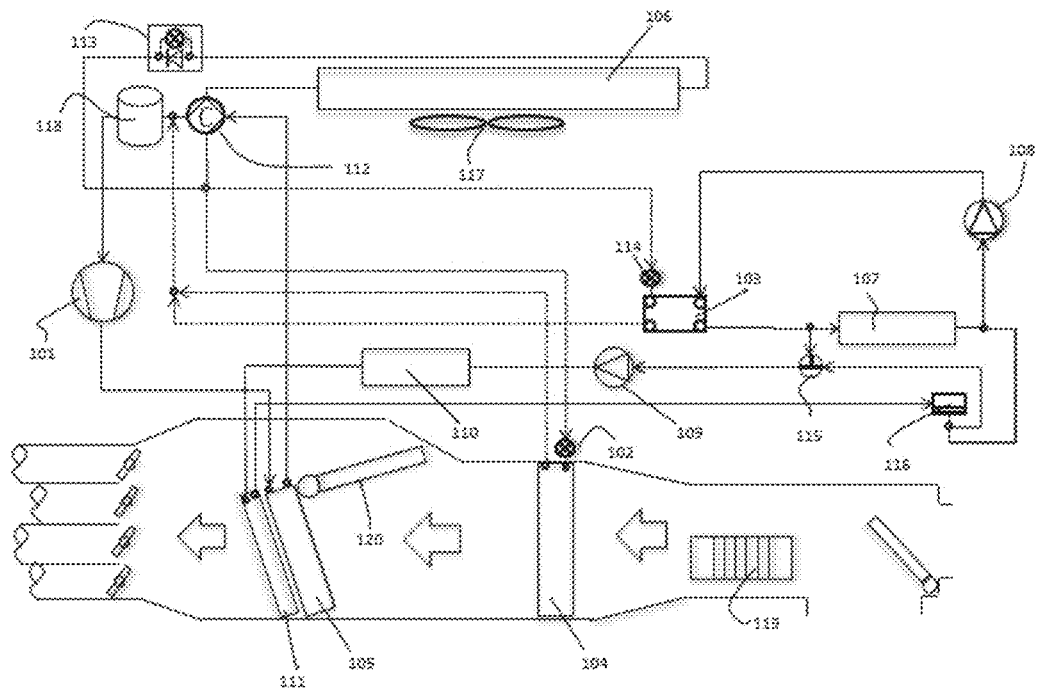
Figure 11:
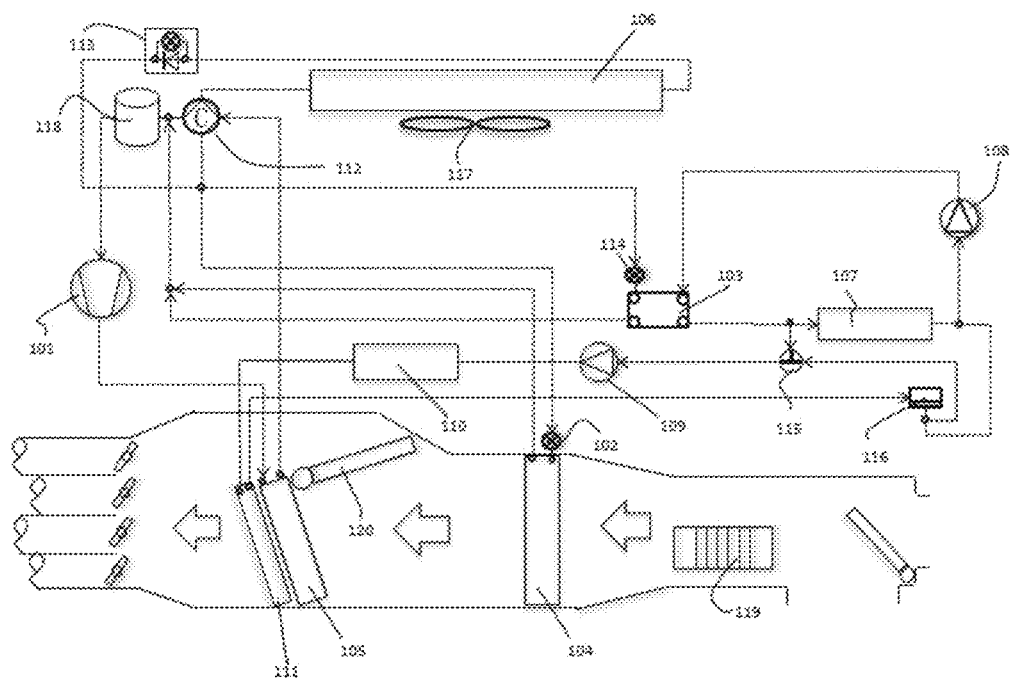
Figure 11A:
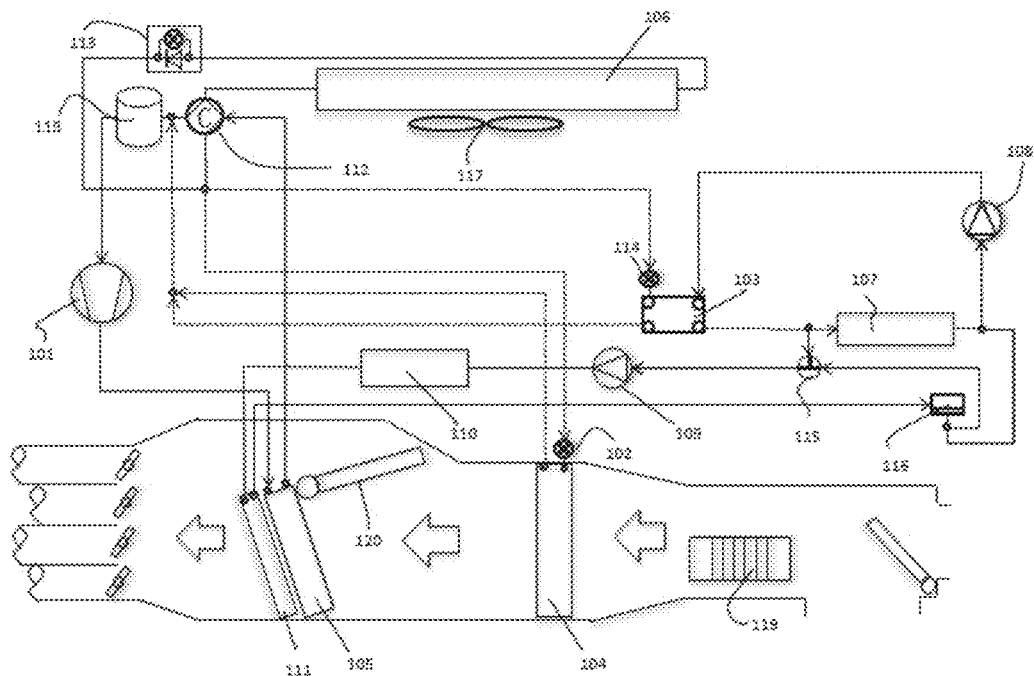
Figure 12:
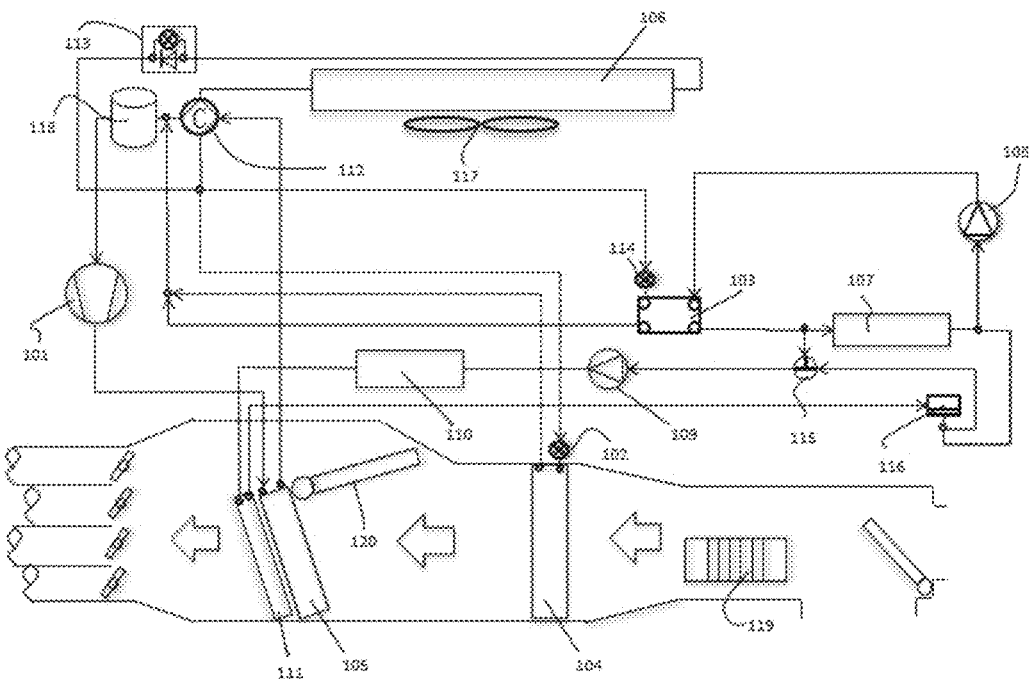
Figure 13:
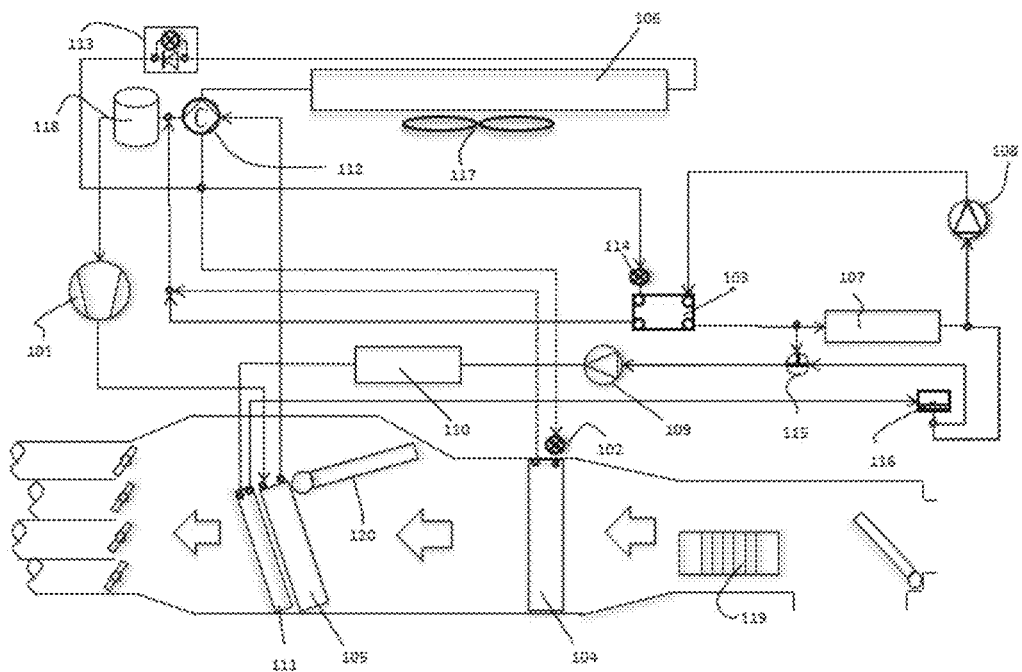

When the heating efficiency of the heater 110 is low, the cooling liquid system is switched on for heating, and the thermal management system is in the second heating mode. The second pump 109 is switched on, the heater 110 is switched on, and the cooling liquid is circulated in the heating/cooling loop. The third valve device is in the second working state, the throttling structure unit 113*c* and the second throttling device 114 are switched on. The first communication port 112*a* of the third valve device 112 is in communication with the fourth communication port 112*d* of the third valve device 112. The fourth communication port 112*d* is in communication with the fourth valve device 113, the fourth heat exchanger 106, the second communication port 112*b* and the third communication port 112*c* of the third valve device 112, and the compressor 101. In a case that the battery does not work, referring to FIG. 11*a*, the battery loop and the heating/cooling loop are not conducted. A refrigerant in the thermal management system is compressed by the compressor 101, and thus, the refrigerant of a low temperature and low pressure is converted to a refrigerant of a high temperature and high pressure. The refrigerant outputted from an outlet of the compressor 101 enters the third heat exchanger 105 through an inlet for a refrigerant of the third heat exchanger 105. A heat exchanger process occurs between the refrigerant from the third heat exchanger 105 and ambient air surrounding the third heat exchanger 105 in the air duct, that is, the refrigerant from the third heat exchanger 105 dissipates heat to the ambient air. An outlet for a refrigerant of the third heat exchanger 105 is in communication with the throttling structure unit 113*d* through the first communication port 112*a* and the fourth communication port 112*d*. The refrigerant enters the fourth heat exchanger 106 after being throttled by the throttling structure unit 113*c*. A heat exchange process occurs between the refrigerant of a low temperature and low pressure and ambient air surrounding the heat exchanger in the fourth heat exchanger 106, that is, the refrigerant of a low temperature and low pressure absorbs heat from the ambient air. A fan 117 arranged near the fourth heat exchanger 106 blows the ambient air surrounding the fourth heat exchanger 106, to form an air flow, which may accelerate the heat exchange process and help the refrigerant in the fourth heat exchanger 106 to absorb heat from the ambient air. When the battery and so on is in a high temperature and requires for cooling, referring to FIG. 12, the third valve device is in the second working state. The first communication port of the third valve device is in communication with the fourth communication port of the third valve device. The fourth communication port of the third valve device is in communication with the second throttling device and the first flow channel of the first heat exchanger. The fourth communication port of the third valve device is in communication with the fourth valve device 113 and the fourth heat exchanger 106. The first flow channel of the first heat exchanger 103 is connected the fourth heat exchanger and the compressor 101. The first pump 108 and the second pump 109 are switched on. The battery loop and the heating/cooling loop are conducted. The cooling liquid is circulated in the battery loop. An outlet for a refrigerant of the third heat exchanger 105, after passing by the first communication port 112*a* of the third valve device and the fourth communication port 112*d* of the third valve device, is divided into two paths, one path is in communication with the throttling structure unit 113*d* and another path is in communication with the second throttling device 114. The refrigerant being throttled by the throttling structure unit 113*c* enters the fourth heat exchanger 106, and a heat exchange process occurs between the refrigerant of a low temperature and low pressure and air surrounding the fourth heat exchanger 106, that is, the refrigerant of a low temperature and low pressure absorbs heat from the air. The refrigerant enters the first flow channel of the first heat exchanger 103 through the second throttling device 114. A heat exchange process occurs between the refrigerant in the first flow channel of the first heat exchanger 103 and a cooling liquid in the second flow channel of the first heat exchanger 103. A heat exchange process occurs between the cooling fluid after being cooled and the battery and so on in the battery heat exchanger 107, that is, the heat exchanger 107 absorbs heat from the battery and so on. The thermal management system obtains the heat absorbed by the heat exchanger 107 from the battery through the first heat exchanger 103. When the battery and so on is in a low temperature and requires for heating, the third valve device 112 is in the second working state. The first communication port of the third valve device is in communication with the fourth communication port of the third valve device. The fourth communication port of the third valve device is in communication with the second throttling device and the first flow channel of the first heat exchanger. The fourth communication port of the third valve device is in communication with the fourth valve device and the fourth heat exchanger. The first flow channel of the first heat exchanger and the fourth heat exchanger are in communication with the compressor. The first pump 108 and the second pump 109 are switched on. The battery loop and the heating/cooling loop are conducted, or not conducted. Referring to FIG. 10, the first pump 108 and the second pump 109 are activated, and the cooling liquid in the heating/cooling loop is circulated after being heated by the heater. The first valve device 115 opens to a certain degree, a part of the cooling liquid after being heated by the heater is pumped away by the first pump 108 and enters the battery loop, so as to heat the battery and so on and so on in the battery heat exchanger 107. Alternatively, referring to FIG. 14, the first pump 108 and the second pump 109 are switched on, and the cooling liquid in the heating/cooling loop is circulated after being heated by the heater. The cooling liquid in the battery loop absorbs heat from the heated cooling liquid in the second flow channel of the second heat exchanger in the second heat exchanger. The heated cooling liquid then heats the battery and so on in the battery heart exchanger 107. Alternatively, referring to FIG. 13, the first pump 108 and the second pump 109 are switched on, and the cooling liquid in the heating/cooling loop is circulated after being heated by the heater. The first valve device 115 opens to a certain degree, a part of the cooling liquid after being heated by the heater is pumped away by the first pump 108 and enters the battery loop, to heat the battery and so on in the battery heat exchanger 107. An outlet for a refrigerant of the third heat exchanger 105, after passing by the first communication port 112a of the third valve device and the fourth communication port 112d of the third valve device, is divided into two paths, one path is in communication with the throttling structure unit 113d and another path is in communication with the second throttling device 114. The refrigerant being throttled by the throttling structure unit 113c enters the fourth heat exchanger 106, and a heat exchange process occurs between the refrigerant of a low temperature and low pressure and air surrounding the fourth heart exchanger 106, that is, the refrigerant of a low temperature and low pressure absorbs heat from the air. The refrigerant enters the first flow channel of the first heat exchanger 103 through the second throttling device 114. A heat exchange process occurs between the refrigerant in the first flow channel of the first heat exchanger 103 and the cooling liquid in the second flow channel of the first heat exchanger 103. The cooling liquid of a high temperature pumped away by the first pump 108 from the heating/cooling loop is cooled by the first heat exchanger 103 to a proper temperature. A heat exchange process occurs in the battery heat exchanger 107 between the cooling liquid in the proper temperature and the battery and so on, and thus, the battery and so on are heated.

It is understood that, the channel for the cooling liquid in the heater is just a flow channel of the cooling liquid system. If the heat cannot satisfy the demand, the refrigerant flowing out from the fourth heat exchanger 106 may return back to the compressor. If the refrigerant is likely to be a liquid or in a gas-liquid two phase, a gas-liquid separator may be arranged. The refrigerant flowing out from the fourth heat exchanger 106 enters the gas-liquid separator 118. After being separated by the gas-liquid separator 118, a liquid refrigerant is stored in the gas-liquid separator, and a refrigerant of a low temperature and low pressure enters the compressor 101 to be compressed again to a refrigerant of a high temperature and high pressure by the compressor 101, and so on. If the compressor can accept the liquid refrigerant, a gas-liquid separator 118 may be unnecessary. The gas-liquid separator 118 may be replaced by a liquid receiver. In addition, if the refrigerant is not in gas-liquid two phase, a gas-liquid separator may be unnecessary.

When the temperature outside is low, and a heat pump can provide enough heat for passengers, the thermal management system is in the third heating mode. Referring to FIG. 3, in a case that the battery does not require for heating or cooling, the first pump 108 and the second pump 109 are switched off, and the third valve device 112 is in the second working state. The first communication port 112a of the third valve device 112 is in communication with the fourth communication port 112d of the third valve device 112. The second communication port 112b of the third valve device 112 is in communication with the third communication port 112c of the third valve device 112. The fourth communication port 112d of the third valve device 112 is in communication with the second communication port 113b of the fourth valve device 113 and the fourth heat exchanger 106. The second communication port 112b of the third valve device 112, the third communication port 112c of the third valve device 112 and the compressor 101 are connected. The refrigerant at an outlet of the third heat exchanger 105 enters the throttling structure unit 113 through the first communication port 112a of the third valve device 112 and the fourth communication port 112d of the third valve device 112. The refrigerant enters the fourth heat exchanger 106 after being throttled by the throttling structure unit 113c. A heat exchange process occurs between the refrigerant of a low temperature and low pressure and air surrounding the heat exchanger in the fourth heat exchanger 106, that is, the refrigerant of a low temperature and low pressure absorbs heat from the air. Then the refrigerant returns back to the compressor 101. When the battery is in a high temperature and requires for cooling, referring to FIG. 6, the first pump 108 is switched on, and the cooling liquid is circulated in the battery loop. The third valve device 112 is in the second working state. The first communication port 112a of the third valve device 112 is in communication with the fourth communication port 112d of the third valve device 112. The second communication port 112b of the third valve device 112 is in communication with the third communication port 112c of the third valve device 112. The fourth communication port 112d of the third valve device 112 is in communication with the second communication port 113b of the fourth valve device 113 and the fourth heat exchanger 106. The second communication port 112b of the third valve device 112, the third communication port 112c of the third valve device 112 and the compressor 101 are connected. The fourth communication port 112d of the third valve device 112 is in communication with the second throttling device 114, the first flow channel of the first heat exchanger 113 and the compressor. An outlet for a refrigerant of the third heat exchanger 105, after passing by the first communication port 112a of the third valve device 112 and the fourth communication port 112d of the third valve device 112, is divided into two paths, one path is in communication with the throttling structure unit 113d and another path is in communication with the second throttling device 114. The refrigerant being throttled by the throttling structure unit 113c enters the fourth heat exchanger 106, and a heat exchange process occurs between the refrigerant of a low temperature and low pressure and air surrounding the fourth heat exchanger 106, that is, the refrigerant of a low temperature and low pressure absorbs heat from the air. The refrigerant enters the first flow channel of the first heat exchanger 103 through the second throttling device 114. A heat exchange process occurs between the refrigerant in the first flow channel of the first heat exchanger 103 and the cooling liquid in the second flow channel of the first heat exchanger 103. A heat exchange process occurs between the cooled refrigerant and the battery and so on in the battery heat exchanger 107, that is, the heat exchanger 107 absorbs heat from the battery and so on. The thermal management system obtains the heat absorbed by the heat exchanger 107 from the battery and so on through the first heat exchanger 103.

Figure 5:
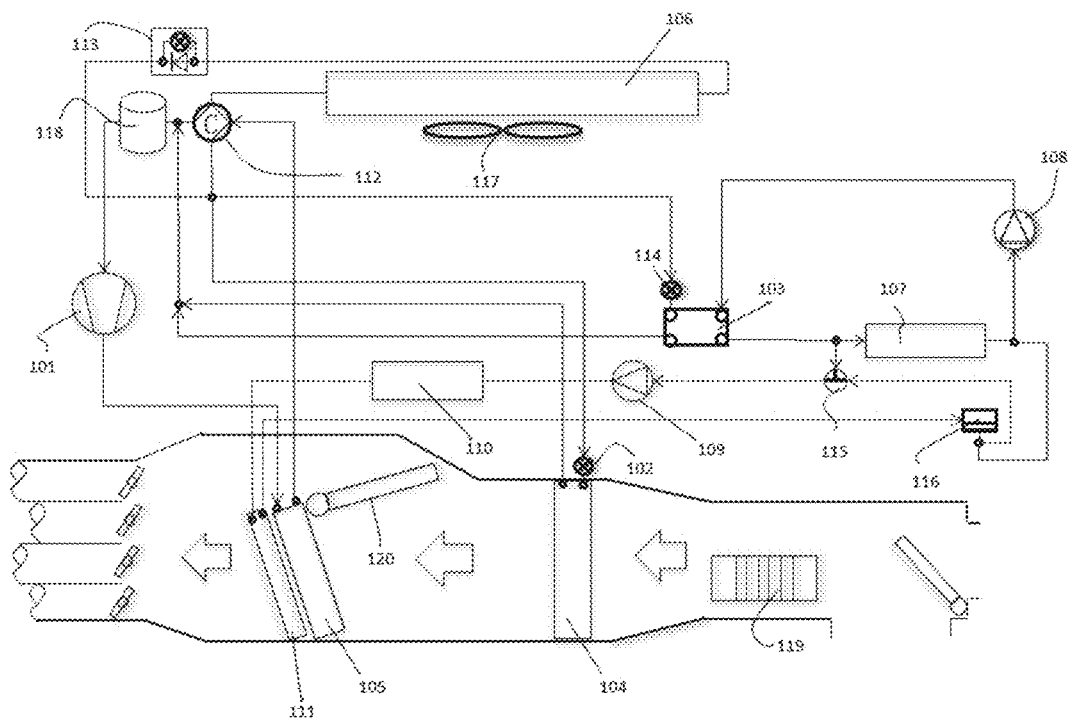
Figure 6:
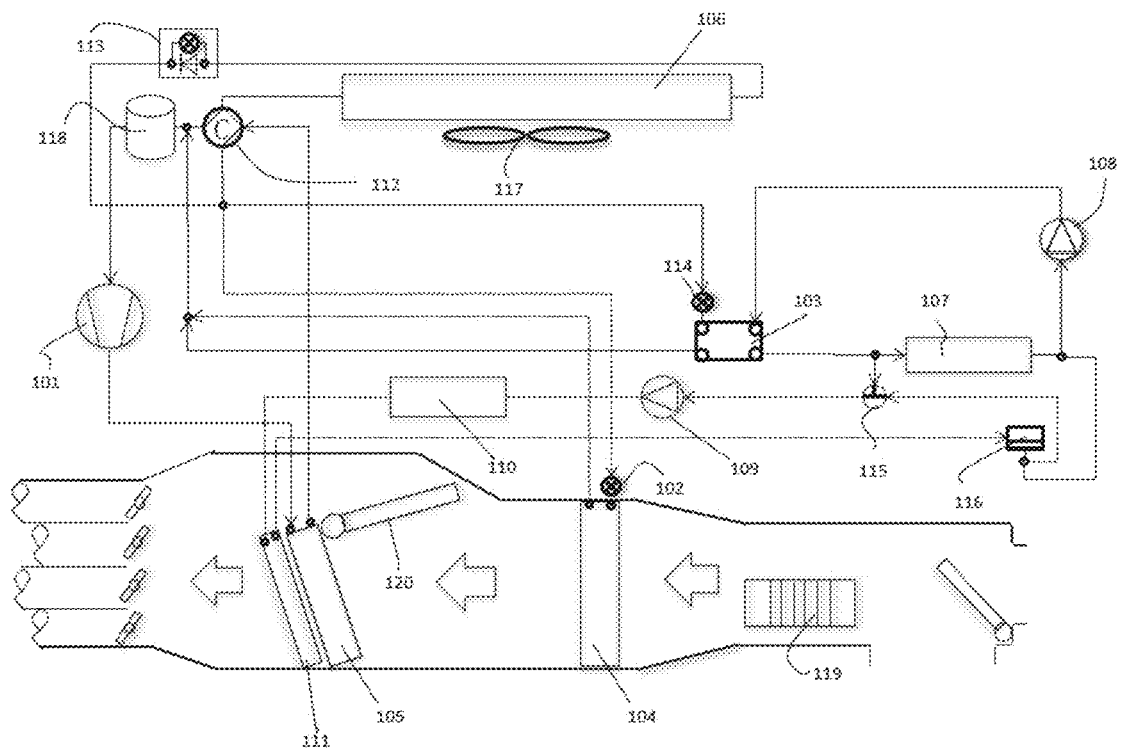

When the humidity of the passenger compartment is high, water vapor in air is easy to condense on glass windows of the vehicle, which may affect view and cause security risks. Therefore, dehumidification is necessary to dehumidify the air in the passenger compartment. The thermal management system includes a first dehumidification mode, a second dehumidification mode and a third dehumidification mode. When the battery requires for heating, the first dehumidification mode is on, referring to FIG. 9, the first pump 108 and the second pump 109 are switched on. The cooling liquid is heated by the heater in the heating/cooling loop, and then a part of the cooling liquid is pumped into the battery loop by the first pump 108 and is circulated in the battery loop, to heat the battery and so on in the battery heat exchanger 107. The third valve device is in the second working state, and the first communication port of the third valve device and the fourth communication port of the third valve device are conducted. The fourth communication port of the third valve device is in communication with the first throttling device and the fifth heater. The fourth communication port of the third valve device is in communication with the first valve device, the fourth heat exchanger, the fifth heat exchanger and the compressor. An outlet for a refrigerant of the fourth communication port 112d is divided into two paths, one path is in communication with the fourth valve device 113 and enters the fourth heat exchanger 106 through the throttling structure unit 113c, and another path is in communication with the second throttling device 102. After being throttled, the refrigerant enters the fifth heat exchanger 104 and absorbs heat in the fifth heat exchanger 104. The water vapor in air surrounding the fifth heat exchanger 104 is cooled and condensed, and thus, dehumidification is realized. The refrigerant at an outlet of the compressor 101 dissipates heat in the third heat exchanger 105, and thus the air surrounding the third heat exchanger 105 is heated, to meet requirements of passengers. If the outside temperature is high, it is unnecessary to heat the battery. When the battery is in a high temperature and requires for cooling, however, the second dehumidification mode is on. Referring to FIG. 5, the first pump 108 is switched on, the cooling liquid is circulated in the battery loop, and the third valve device 113 is in the second working state. The first communication port 112a of the third valve device 112 is in communication with the fourth communication port of the third valve device. The fourth communication port of the third valve device is in communication with the first throttling device and the fifth heat exchanger. The fourth communication port of the third valve device is in communication with the second throttling device and the first flow channel of the first heat exchanger. The fourth communication port of the third valve device is in communication with the fourth valve device and the fourth heat exchanger. The fifth heat exchanger, the first flow channel of the first heat exchanger, an outlet of the fourth heat exchanger and an inlet of the compressor are connected. An outlet for a refrigerant of the fourth communication port 112d of the third valve device 112 is divided into three paths. One path is in communication with the first throttling device 102; the refrigerant is throttled by the first throttling device 102 and then enters the fifth heat exchanger 104, so as to absorb heat in the fifth heat exchanger 104. The air surrounding the fifth heat exchanger 104 is cooled, and the water vapor in the air is condensed, thus, dehumidification is realized. Another path is in communication with the second throttling device 114, where the refrigerant absorbs heat in the first heat exchanger 103, so as to cool the cooling liquid in the second flow channel of the first heat exchanger 103. The cooled cooling liquid enters into the battery heat exchanger 107, so as to cool the battery and so on. A third path is in communication with the fourth valve device 113, the refrigerant enters the fourth heat exchanger 106 after passing by the throttling structure unit 113c, absorbs heat in the fourth heat exchanger 106, and returns back to the compressor, and so on.

When the battery is in a proper temperature, the third dehumidification mode is on. The first pump 108 is switched off, and the cooling liquid in the heating/cooling loop is not circulated. The third valve device 113 is in the second working state. The first communication port of the third valve device is in communication with the fourth communication port of the third valve device. The fourth communication port of the third valve device is in communication with the first throttling device and the fifth heat exchanger. The fourth communication port of the third valve device is in communication with the first valve device and the fourth heat exchanger. The fifth heat exchanger, an outlet of the fourth heat exchanger and an inlet of the compressor are connected. An outlet for a refrigerant of the fourth communication port 112d of the third valve device 112 is divided into two paths. One path is in communication with the second communication port 113b of the fourth valve device 113, and the refrigerant enters the fourth heat exchanger 106 after passing by the throttling structure unit 113c. Another path is in communication with the first throttling device 102, and the refrigerant enters the fifth heat exchanger 104 after being throttled, to absorb heat in the fifth heat exchanger 104. Thus, a temperature of the ambient air is lowered, the water vapor in the air is condensed, and dehumidification is realized. The refrigerant at an outlet of the compressor 101 enters the third heat exchanger 105 and dissipates heat in the third heat exchanger 105, and thus the air surrounding the third heat exchanger 105 is heated.

Figure 4:
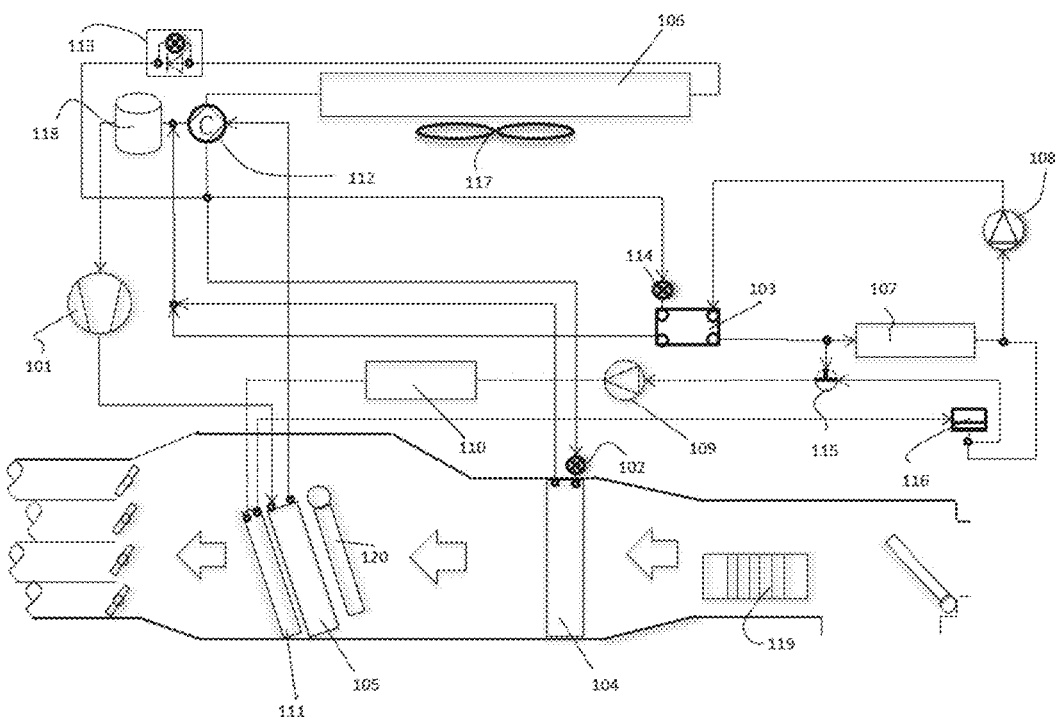

When the temperature in the passenger compartment is high and cooling is required to comfort the passengers, the thermal management system is switched to the cooling mode. The outside temperature is high and it is unnecessary to heat the battery. The cooling mode of the thermal management system includes a first cooling mode and a second cooling mode. In the first cooling mode, the battery is in a high temperature and requires for cooling. Referring to FIG. 4, the first pump 108 is switched on, the cooling liquid is circulated in the battery loop, and the third valve device 112 is in the first working state. The first communication port of the third valve device is in communication with the second communication port of the third valve device. The second communication port of the third valve device is in communication with the fourth heat exchanger and a one-way structure unit. The one-way structure unit is in communication with the second throttling device and the first flow channel of the first heat exchanger. The one-way structure unit is in communication with the first throttling device and the fifth heat exchanger. The fifth heat exchanger, an outlet of the first heat exchanger and an inlet of the compressor are connected. A refrigerant of a high temperature and high pressure is outputted from the compressor 101, and enters the fifth heat exchanger 105. Since the ventilation door 120 is closed, the refrigerant of a high temperature and high pressure enters the first communication port 112a of the third valve device 112 from the fifth heat exchanger 105, then enters the second communication port 112b of the third valve device 112 through the first communication port 112a of the third valve device 112, and finally enters the fourth heat exchanger 106. In the fourth heat exchanger 106, the refrigerant of a high temperature and high pressure dissipates heat, and is converted to a refrigerant of a low temperature and low pressure. To improve the cooling effect, the fan 117 is open. The refrigerant of a low temperature and low pressure is divided into two paths after passing by the one-way structure unit 113d. One path of the refrigerant enters the second throttling device 114, and enters the first heat exchanger 103 after being throttled. The refrigerant of a low temperature and low pressure in the first heat exchanger 103 absorbs heat from the cooling liquid in the second flow channel of the first heat exchanger 103. The cooling liquid that is cooled enters the battery heat exchanger 107, so as to cool the battery and so on. Another path of the refrigerant enters the first throttling device 102, and enters the fifth heat exchanger 104 after being throttled. The refrigerant of a low temperature and low pressure absorbs heat in the fifth heat exchanger 104, the heat of the air surrounding the fifth heat exchanger 104 is reduced, and the cooling effect is realized. The refrigerant passes through the fifth heat exchanger 104, the first heat exchanger 103, and returns back to the compressor 101, and so on.

When the battery is in a proper temperature, the second cooling mode is on. Referring to FIG. 1, the first pump 108 is switched off, and the third valve device 112 is in the first working state. The first communication port of the third valve device is in communication with the second communication port of the third valve device. The second communication port of the third valve device is in communication with the fourth heat exchanger, the one-way structure unit, the first throttling device, the fifth heat exchanger, and the compressor. A refrigerant of a high temperature and high pressure is outputted from the compressor 101, and enters the third heat exchanger 105. Since the ventilation door 120 is closed, the refrigerant of a high temperature and high pressure passes by the first communication port 112a and the second communication port 112b of the third valve device 112, and then enters the fourth heat exchanger 106. In the fourth heat exchanger 106, the refrigerant of a high temperature and high pressure dissipates heat, and is converted to a refrigerant of a low temperature and high pressure. The refrigerant of a low temperature and high pressure enters into the first throttling device 102 through the one-way structure unit 113d, and is converted to a refrigerant of a low temperature and low pressure after being throttled. The refrigerant of a low temperature and low pressure absorbs heat in the fifth heat exchanger 104, to lower the temperature of the air surrounding the fifth heat exchanger 104, and thus the cooling effect is realized. The refrigerant of a low temperature and low pressure passes through the fifth heat exchanger 104 and returns back to the compressor, and so on.

Figure 7:
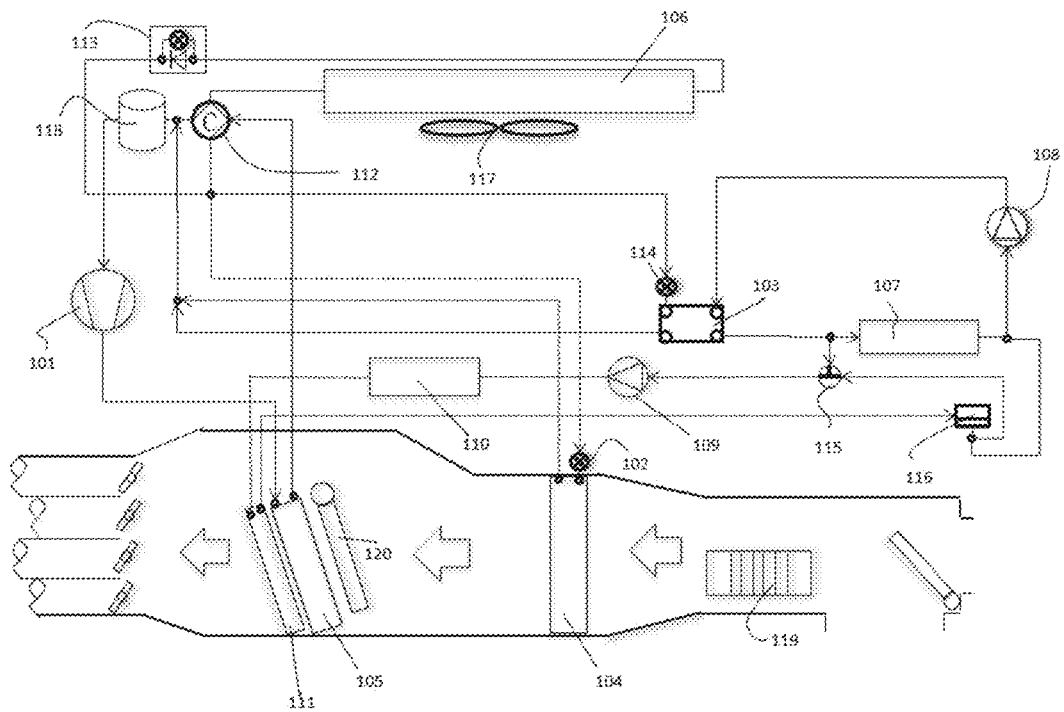
Figure 7A:
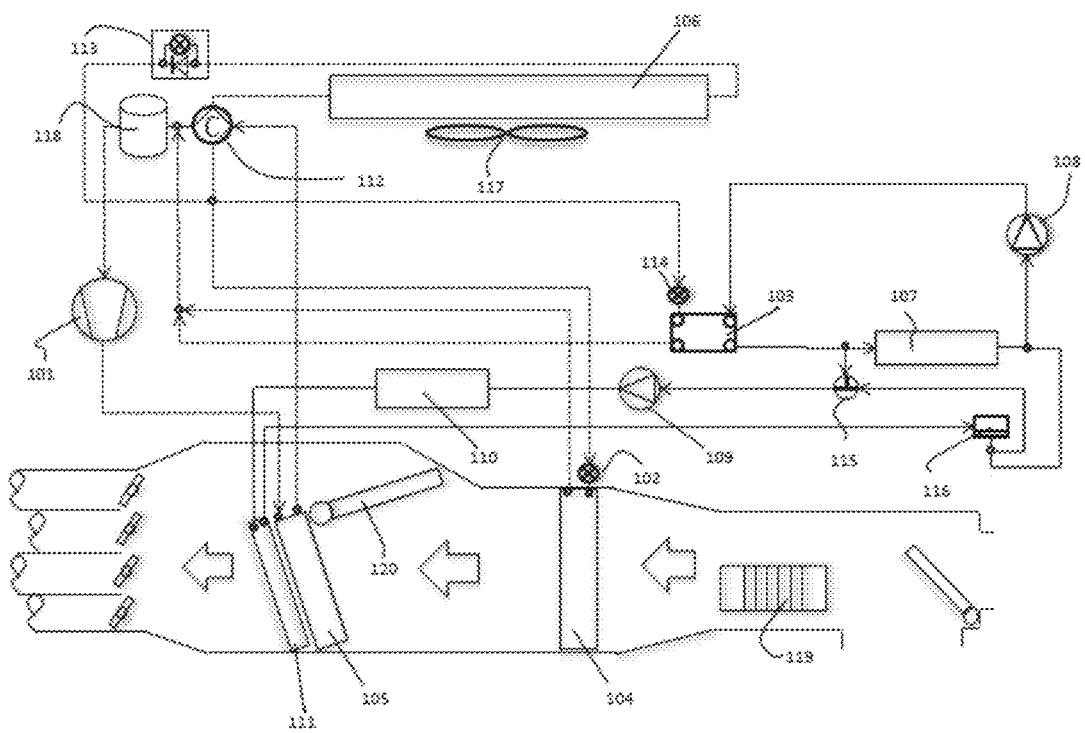
Figure 8:
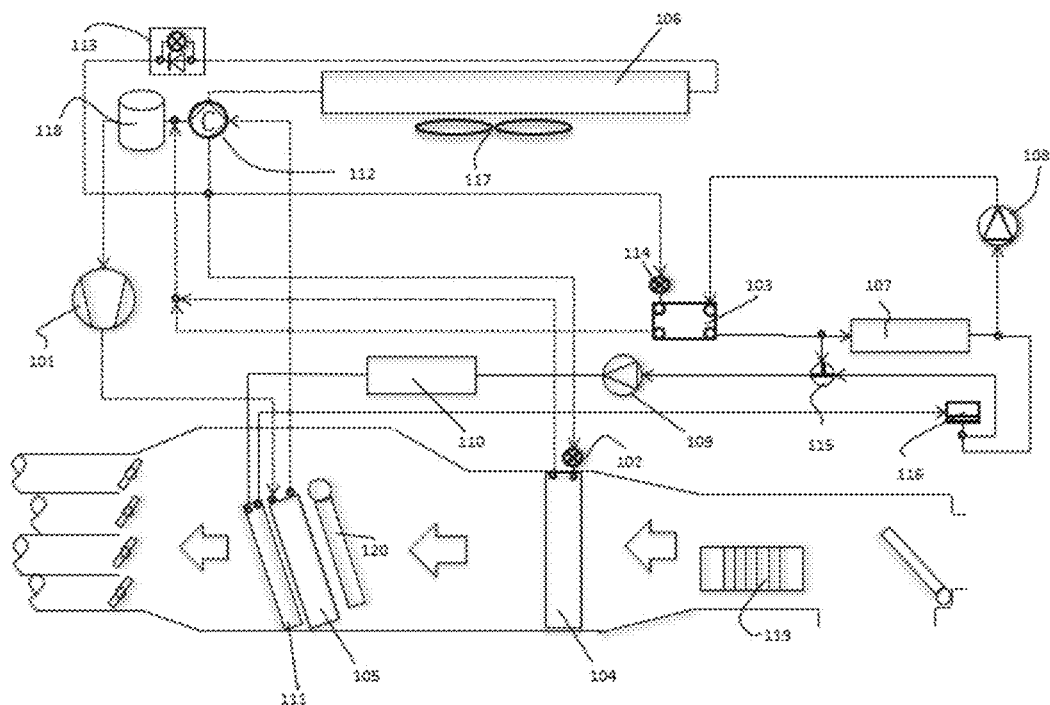
Figure 9:
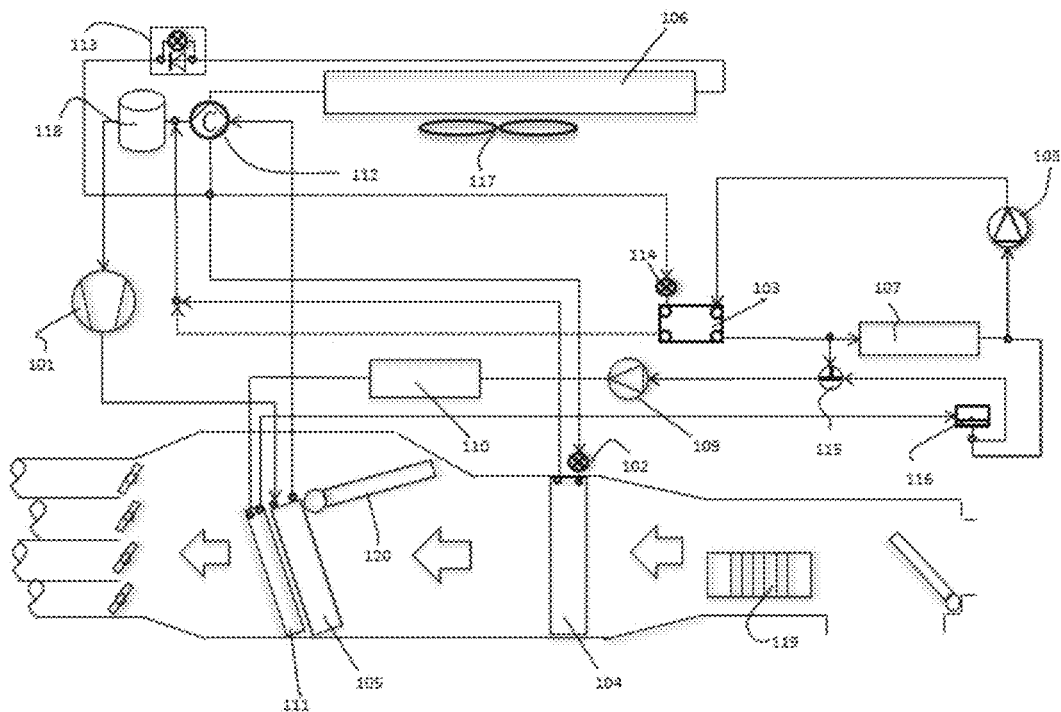

The thermal management system includes a first circulation mode, a second circulation mode and a third circulation mode. Referring to FIGS. 7, 7a and 8, in the first circulation mode, the compressor 101 of the thermal management system is switched off, or, the refrigerant in the refrigerant system is not circulated. When the battery and so on are in a low temperature and requires for heating, referring to FIG. 8, the first pump 108 and the second pump 109 are switched on. The first valve device 115 is adjusted, so as to make the cooling liquid to enter the radiator 111 after being heated by the heater 110. The ventilation door 120 is closed. A part of the cooling liquid left from the radiator 111 is pumped into the battery loop by the first pump 108 to heat the battery in the battery heat exchanger 107. And another part of the cooling liquid flows through the third communication port 115c of the first valve device 115. The part of the cooling liquid in the battery loop flows through the first communication port 115a. The two parts of the cooling liquid returns back to the heater 110 from the second communication port 115b, and so on.

In a case of charging the battery, cooling is required by the battery. Referring to FIG. 7a, the second circulation mode is on. The first pump 108 and the second pump 109 are switched on, and the first valve device 115 is adjusted. A part of the cooling liquid in the battery loop enters the second pump 109 through the first communication port 115a and the second communication port 115b. The heater 110 is not switched on, and the cooling liquid then enters the radiator 111 through the heater 110. The ventilation door 120 is open, thus the cooling liquid dissipates heat to the air. The fan 119 is switched on, and thermal air in the passenger compartment is exhausted outside through circulation. A part of the cooled cooling liquid is pumped into the battery loop by the first pump 108, so as to cool the battery in the battery heat exchanger 107. Another part of the cooled cooling liquid returns back to the second pump 109 from the third communication port 115c of the first valve device 115, and so on.

If the battery has worked for a long time and is in a high temperature, cooling is required for the battery, thus, the third circulation mode is on. Referring to FIG. 7, the first pump 108 is switched on, and the cooling liquid is circulated in the battery loop. The compressor 101 is switched on, and the third valve device 112 is in the first working state. The refrigerant outputted by the compressor 101 enters the third heat exchanger 105. Since the ventilation door 120 is closed, the refrigerant enters the fourth heat exchanger 106 through the first communication port 112a of the third valve device 112 and the second communication port 112b of the third valve device 112. After dissipating heat in the fourth heat exchanger 106, the cooled refrigerant enters the second throttling device 114, and is converted to a refrigerant of a low temperature and low pressure after being throttled. The refrigerant of a low temperature and low pressure enters the first heat exchanger 103, absorbs heat in the first heat exchanger 103, and reduces the temperature of the cooling liquid in the second flow channel of the first heat exchanger 103. The cooled cooling liquid enters the battery heat exchanger 107, to cool the battery and so on. The refrigerant left from the first heat exchanger 103 then returns back to the compressor 101, and so on.

Figure 15:
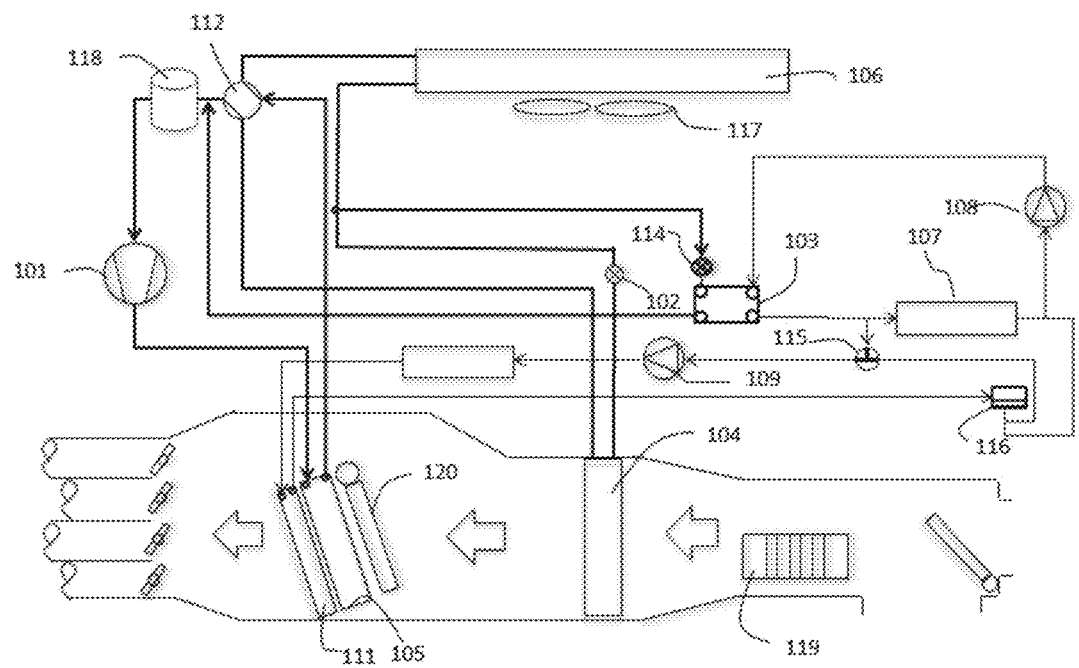
FIG. 15 is a schematic diagram of a thermal management system according to an embodiment of the present application.
Figures 16, 17:
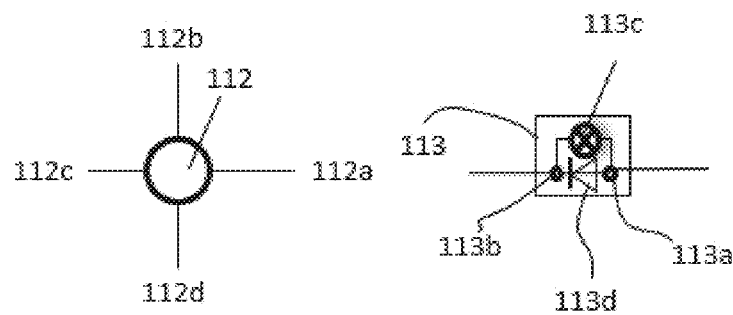
FIG. 16 is a schematic diagram of a third valve device according to an embodiment of the present application.
FIG. 17 is a schematic diagram of a fourth valve device according to an embodiment of the present application.
Figure 18:
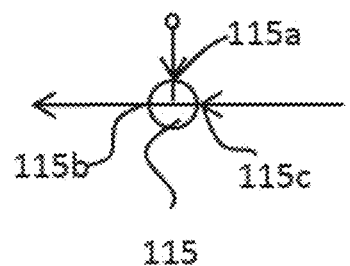
FIG. 18 is a schematic diagram of a first valve device according to an embodiment of the present application.

As another implementation, referring to FIG. 15, the refrigerant system includes a compressor 101, a third heat exchanger 105, a third valve device 112, a fourth heat exchanger 106, a gas-liquid separator 118, a first flow channel of a first heat exchanger 103, a first throttling device 102, a second throttling device 114, and a third valve device 112 including four communication ports. The four communication ports are a first communication port 112a of the third valve device 112, a second communication port 112b of the third valve device 112, a third communication port 112c of the third valve device 112 and a fourth communication port 112d of the third valve device 112.

An outlet of the compressor 101 is in communication with an inlet of the third heat exchanger 105. An outlet of the third heat exchanger 105 is in communication with the first communication port 112a of the third valve device 112. The second communication port 112b of the third valve device 112 is in communication with one end of the fourth heat exchanger 106. An outlet for a refrigerant of the fourth heat exchanger 106 is divided into two paths, and one path is in communication with the first throttling device 102, the fifth heat exchanger 105 and the fourth communication port 112d. The third communication port 112c of the third valve device 112 is in communication with the gas-liquid separator 118 and the compressor 101. Another path is in communication with the second throttling device 114, the first flow channel of the first heat exchanger 103, the gas-liquid separator 118 and the compressor 101.

The third valve device 112 has a first working state and a second working state. In the first working state, the first communication port 112a and the second communication port 112b are conducted, and the third communication port 112c and the fourth communication port 112d are conducted. The fifth heat exchanger 104 absorbs heat from ambient air, to lower the temperature of the passenger compartment and satisfy requirements of passengers. In the second working state, the first communication port 112a and the fourth communication port 112d are conducted, and the second communication port 112b and the third communication port 112c are conducted. A ventilation door 120 is open, and the third heat exchanger 105 dissipates heat to the ambient air, so as to heat the air in the passenger compartment and satisfy requirements of passengers.

The cooling liquid system is similar to the cooling liquid stated in the above embodiments, which is not described in detail herein for simplicity.

It is noted that, the above structural diagram of the refrigerant system is merely illustrative, and is not to limit the present application, and a connection relationship of each component therein is changeable. The refrigerant system provided by the present application may be in multiple types. For example, the refrigerant system may include a first flow channel of a first heat exchanger, a fifth heat exchanger, a third heat exchanger, a fourth heat exchanger, a compressor, a third valve device and a throttling device, which may have functions of cooling at the fifth heat exchanger and heating at the third heat exchanger. For another example, the refrigerant system may include the first flow channel of the first heat exchanger, the fifth heat exchanger, the fourth heat exchanger, the compressor, the third valve device and the throttling device, which has functions of cooling at the fifth heat exchanger and so on.

It is noted that, the embodiments described above are merely illustrative, and should not be understood as to limit technical solutions of the present application, for example, the directional terms such as "front", "back", "right", "left", "up", "down" and so on. Although the present application has been described in detail in conjunction with the above embodiments, it should be understood by those skilled in the art that, various forms of combination, modifications and variants may be made to the present application. And any technical solutions and improvements thereof without departing from the spirit and scope of the present application will fall in the scope of protection of the present application.

The invention claimed is:
1. A thermal management system, comprising:
a battery heat exchanger,
a first pump,
a second pump,
a first heat exchanger,
a heater,
a radiator, and
a first valve device;
wherein the first heat exchanger comprises a first flow channel and a second flow channel, the first flow channel and the second flow channel are fluidically isolated mutually, and heat is exchangeable between a fluid in the first flow channel and a fluid in the second flow channel;
wherein the thermal management system comprises a refrigerant system and a cooling liquid system, the refrigerant system comprises the first flow channel of the first heat exchanger, and the cooling liquid system comprises the second flow channel of the first heat exchanger, the battery heat exchanger, the first pump, the second pump, the heater, the first valve device and the radiator; wherein the cooling liquid system comprises a battery loop and a heating/cooling loop; wherein the second flow channel of the first heat exchanger, the battery heat exchanger and the first pump form a part of the battery loop; wherein the heater, the radiator and the second pump form a part of the heating/cooling loop;
wherein the first valve device is configured to conduct or block a passway between the battery loop and the heating/cooling loop;
wherein the refrigerant system comprises a compressor, a fourth valve device, a third heat exchanger, a fourth heat exchanger, a fifth heat exchanger and an air conditioning box, the third heat exchanger, the fifth heat exchanger and the radiator are located inside the air conditioning box, and the fourth heat exchanger is located outside the air conditioning box;
wherein the thermal management system comprises a first heating mode and a third heating mode;
in the first heating mode, the compressor is not switched on, the second pump is switched on, and the heater is switched on; the cooling liquid in the heating/cooling loop flows into the radiator after being heated by the heater, and dissipates heat to external air out of the radiator;
in the third heating mode, the compressor, the third heat exchanger, the fourth valve device, and the fourth heat exchanger are communicated to form a refrigerant loop, the refrigerant is compressed with a high temperature and a high pressure status by the compressor, then the refrigerant flows into the third exchanger to dissipate heat to the external air out of the third exchanger, after that the refrigerant flows into fourth valve device to be throttled, then the refrigerant flows into fourth heat exchanger to exchange heat with ambient air so as to absorb the heat from the ambient air, and after that the refrigerant flows back to the compressor.

2. The thermal management system according to claim 1, wherein the first valve device comprises two communication ports, a first communication port of the first valve device is in fluidic communication with the battery loop, and a second communication port of the first valve device is in fluidic communication with the heating/cooling loop; wherein the first valve device is configured to adjust flow quantity of a cooling liquid flowing from the first communication port of the first valve device into the second communication port of the first valve device; wherein a pressure of a fluid in a connecting pipe between the battery loop and the first communication port of the first valve device is greater than a pressure of a fluid in a connecting pipe between the heating/cooling loop and the second communication port of the first valve device;

wherein the cooling liquid system comprises a kettle, and an installation height of the kettle is higher than installation heights of the battery heat exchanger, the first pump, the second pump, the first heat exchanger, the heater, the radiator and the first valve device.

3. The thermal management system according to claim 2, wherein the first valve device further comprises a third communication port, and the third communication port of the first valve device is in fluidic communication with the heating/cooling loop;

wherein the first valve device comprises a first working state and a second working state; when the first valve device is in the first working state, a pas sway between the first communication port of the first valve device and the second communication port of the first valve device is conducted, and a passway between the third communication port of the first valve device and the second communication port of the first valve device is conducted; and when the first valve device is in the second working state, a passway between the first communication port of the first valve device and the second communication port of the first valve device is blocked;

wherein the cooling liquid system comprises a first circulation mode, a second circulation mode and a third circulation mode; in the first circulation mode, the first valve device is in the first working state, the heater is switched on, and the passway between the battery loop and the heating/cooling loop is conducted by the connecting portion; in the second circulation mode, the first valve device is in the first working state, the heater is switched off, and the pas sway between the battery loop and the heating/cooling loop is conducted by the connecting portion; in the third circulation mode, the first valve device is in the second working state, the passway between the first communication port of the first valve device and the second communication port of the first valve device is not conducted, and the pas sway between the battery loop and the heating/cooling loop is not conducted.

4. The thermal management system according to claim 1, wherein the first valve device is a three-way proportional valve, and the first valve device is configured to adjust flow quantity of a cooling liquid flowing from the first communication port of the first valve device into the second communication port of the first valve device; or wherein the first valve device comprises a first valve module having two end ports, a first end port of the first valve module is in fluidic communication with the first communication port of the first valve device, and a second end port of the first valve module is in fluidic communication with the second communication port of the first valve device and the third communication port of the first valve device; the first valve module is configured to block or conduct or adjust a fluid flowing from the first communication port of the first valve device into the second end port of the first valve module; when the first valve device is in the first working state, the first valve module is switched on, and when the first valve device is in the second working state, the first valve module is switched off; or wherein the first valve device comprises a first valve module and a second valve module both having two end ports, a first end port of the first valve module is in fluidic communication with the first communication port of the first valve device, and a first end port of the second valve module is in fluidic communication with the third communication port of the first valve device, a second end port of the first valve module and a second end port of the second valve module are in fluidic communication with the second communication port of the first valve device; the first valve module is configured to block or conduct or adjust a fluid flowing from the first communication port of the first valve device into the second end port of the first valve module; the second valve module is configured to adjust flow quantity of a fluid flowing from the third communication port of the first valve device into the second end port of the second valve module; when the first valve device is in the first working state, the first valve module is switched on and the second valve module is switched on; when the first valve device is in the second working state, the first valve module is switched off and the second valve module is switched on;

wherein the connecting portion comprises a valve having three communication ports, at least one of a first connecting port of the valve, a second connecting port of the valve and a third connecting port of the valve is located in the battery loop, and at least one of the first connecting port of the valve, the second connecting port of the valve and the third connecting port of the valve is located in the heating/cooling loop; the valve is configured to control flow quantity of the first connecting port of the valve, the second connecting port of the valve and the third connecting port of the valve; or the connecting portion comprises a three-way component having three communication ports, at least one of a first connecting port of the three-way component, a second connecting port of the three-way component and a third connecting port of the three-way component is located in the battery loop, and at least one of the first connecting port of the three-way component, the second connecting port of the three-way component and the third connecting port of the three-way component is located in the heating/cooling loop.

5. The thermal management system according to claim 2, wherein the first valve device is a three-way proportional valve, and the first valve device is configured to adjust flow quantity of a cooling liquid flowing from the first communication port of the first valve device into the second communication port of the first valve device; or wherein the first valve device comprises a first valve module having two end ports, a first end port of the first valve module is in fluidic communication with the first communication port of the first valve device, and a second end port of the first valve module is in fluidic communication with the second communication port of the first valve device and the third communication port of the first valve device; the first valve module is configured to block or conduct or adjust a fluid flowing from the first communication port of the first valve device into the second end port of the first valve module; when the first valve device is in the first working state, the first valve module is switched on, and when the first valve device is in the second working state, the first valve module is switched off; or wherein the first valve device comprises a first valve module and a second valve module both having two end ports, a first end port of the first valve module is in fluidic communication with the first communication port of the first valve device and a first end port of the second valve module is in fluidic communication with the third communication port of the first valve device, a second end port of the first valve module and a second end port of the second valve module are in fluidic communication with the second communication port of the first valve device; the first valve module is configured to block or conduct or adjust a fluid flowing from the first communication port of the first valve device into the second end port of the first valve module; the second valve module is configured to adjust flow quantity of a fluid flowing from the third communication port of the first valve device into the second end port of the second valve module; when the first valve device is in the first working state, the first valve module is switched on and the second valve module is switched on; when the first valve device is in the second working state, the first valve module is switched off and the second valve module is switched on;

wherein the connecting portion comprises a valve having three communication ports, at least one of a first connecting port of the valve, a second connecting port of the valve and a third connecting port of the valve is located in the battery loop, and at least one of the first connecting port of the valve, the second connecting port of the valve and the third connecting port of the valve is located in the heating/cooling loop; the valve is configured to control flow quantity of the first connecting port of the valve, the second connecting port of the valve and the third connecting port of the valve; or the connecting portion comprises a three-way component having three communication ports, at least one of a first connecting port of the three-way component, a second connecting port of the three-way component and a third connecting port of the three-way component is located in the battery loop, and at least one of the first connecting port of the three-way component, the second connecting port of the three-way component and the third connecting port of the three-way component is located in the heating/cooling loop.

6. The thermal management system according to claim 3, wherein the first valve device is a three-way proportional valve, and the first valve device is configured to adjust flow quantity of a cooling liquid flowing from the first communication port of the first valve device into the second communication port of the first valve device; or wherein the first valve device comprises a first valve module having two end ports, a first end port of the first valve module is in fluidic communication with the first communication port of the first valve device, and a second end port of the first valve module is in fluidic communication with the second communication port of the first valve device and the third communication port of the first valve device; the first valve module is configured to block or conduct or adjust a fluid flowing from the first communication port of the first valve device into the second end port of the first valve module; when the first valve device is in the first working state, the first valve module is switched on, and when the first valve device is in the second working state, the first valve module is switched off; or wherein the first valve device comprises a first valve module and a second valve module both having two end ports, a first end port of the first valve module is in fluidic communication with the first communication port of the first valve device and a first end port of the second valve module is in fluidic communication with the third communication port of the first valve device, a second end port of the first valve module and a second end port of the second valve module are in fluidic communication with the second communication port of the first valve device; the first valve module is configured to block or conduct or adjust a fluid flowing from the first communication port of the first valve device into the second end port of the first valve module; the second valve module is configured to adjust flow quantity of a fluid flowing from the third communication port of the first valve device into the second end port of the second valve module; when the first valve device is in the first working state, the first valve module is switched on and the second valve module is switched on; when the first valve device is in the second working state, the first valve module is switched off and the second valve module is switched on;

wherein the connecting portion comprises a valve having three communication ports, at least one of a first connecting port of the valve, a second connecting port of the valve and a third connecting port of the valve is located in the battery loop, and at least one of the first connecting port of the valve, the second connecting port of the valve and the third connecting port of the valve is located in the heating/cooling loop; the valve is configured to control flow quantity of the first connecting port of the valve, the second connecting port of the valve and the third connecting port of the valve; or the connecting portion comprises a three-way component having three communication ports, at least one of a first connecting port of the three-way component, a second connecting port of the three-way component and a third connecting port of the three-way component is located in the battery loop, and at least one of the first connecting port of the three-way component, the second connecting port of the three-way component and the third connecting port of the three-way component is located in the heating/cooling loop.

7. The thermal management system according to claim 1, wherein the refrigerant system further comprises, a third valve device and a first throttling device;

wherein the third valve device comprises four communication ports, and the third valve device comprises at least a first working state and a second working state; in the first working state of the third valve device, a first communication port of the third valve device is in fluidic communication with a second communication port of the third valve device, and a third communication port of the third valve device is not in fluidic communication with a fourth communication port of the third valve device; in the second working state of the third valve device, the first communication port of the third valve device is in fluidic communication with the fourth communication port of the third valve device, and the second communication port of the third valve device is in fluidic communication with the third communication port of the third valve device; and wherein an outlet of the compressor is in fluidic communication with the third heat exchanger and the first communication port of the third valve device, the second communication port of the third valve device is in fluidic communication with the fourth heat exchanger and the fourth valve device, the third communication port of the third valve device is in fluidic communication with an inlet of the compressor, and the fourth communication port of the third valve device is in fluidic communication with the fourth valve device, the first throttling device and the second throttling device.

8. The thermal management system according to claim 7, wherein the thermal management system comprises, a second heating mode;
in the second heating mode, the third valve device is in the second working state, the first communication port of the third valve device is in fluidic communication with the fourth communication port of the third valve device, the fourth communication port of the third valve device is in fluidic communication with the fourth valve device, the fourth heat exchanger, the second communication port of the third valve device, the third communication port of the third valve device and the compressor, the second pump is switched on, and the heater is switched on;
in the third heating mode, the third valve device is in the second working state, the first communication port of the third valve device is in the second working state, the first communication port of the third valve device is in fluidic communication with the fourth communication port of the third valve device, the fourth communication port of the third valve device is in fluidic communication with the second throttling device and the first flow channel of the first heat exchanger, the fourth communication port of the third valve device is in fluidic communication with the fourth valve device and the fourth heat exchanger, and the first flow channel of the first heat exchanger is in fluidic communication with the fourth heat exchanger and the compressor.

9. The thermal management system according to claim 7, wherein the thermal management system comprises and a ventilation door, the heater is located outside the air conditioning box, and the radiator is located in a downwind direction of the ventilation door;
wherein the fourth valve device comprises a throttling structure unit and a one-way structure unit, the fourth valve device comprises two communication ports, wherein the one-way structure unit conducts a passway from a first communication port of the fourth valve device to a second communication port of the fourth valve device, and the throttling structure unit conducts a pas sway from the second communication port of the fourth valve device to the first communication port of the fourth valve device.

10. The thermal management system according to claim 7, wherein the refrigerant system comprises a four-way structure having four end ports, a first end port of the four-way structure is in fluidic communication with the second throttling device, a second end port of the four-way structure is in fluidic communication with the fourth communication port of the third valve device, a third end port of the four-way structure is in fluidic communication with the fourth valve device, and a fourth end port of the four-way structure is in fluidic communication with the first throttling device;

wherein the fourth valve device comprises a throttling structure unit and a one-way structure unit, the fourth valve device comprises two communication ports, wherein the one-way structure unit conducts a passway from a first communication port of the fourth valve device to a second communication port of the fourth valve device, and the throttling structure unit conducts a pas sway from the second communication port of the fourth valve device to the first communication port of the fourth valve device;
wherein the thermal management system comprises a first cooling mode and a second cooling mode;
in the first cooling mode, the first pump is switched on, the third valve device is in the first working state, the first communication port of the third valve device and the second communication port of the third valve device are conducted by the third valve device, the second communication port of the third valve device is in fluidic communication with the fourth heat exchanger and the one-way structure unit, the one-way structure unit is in fluidic communication with the second throttling device and the first flow channel of the first heat exchanger, the one-way structure unit is in fluidic communication with the first throttling device and the fifth heat exchanger, the fifth heat exchanger is in fluidic communication with an outlet of the first heat exchanger and the inlet of the compressor;
in the second cooling mode, the first pump is switched off, the third valve device is in the first working state, the first communication port of the third valve device is in fluidic communication with the second communication port of the third valve device, the second communication port of the third valve device is in fluidic communication with the fourth heat exchanger, the one-way structure unit, the first throttling device, the fifth heat exchanger and the compressor;
wherein the thermal management system comprises a first dehumidification mode, a second dehumidification mode and a third dehumidification mode;
in the first dehumidification mode, the third valve device is in the second working state, the first communication port of the third valve device and the fourth communication port of the third valve device are conducted by the third valve device, the fourth communication port of the third valve device is in fluidic communication with the fourth valve device and the fifth heat exchanger, and the fourth communication port of the third valve device is in fluidic communication with the first valve device, the fourth heat exchanger, the fifth heat exchanger, and the compressor;
in the second dehumidification mode, the third valve device is in the second working state, the first communication port of the third valve device is in fluidic communication with the fourth communication port of the third valve device, the fourth communication port of the third valve device is in fluidic communication with the first throttling device and the fifth heat exchanger, the fourth communication port of the third valve device is in fluidic communication with the second throttling device and the first flow channel of the first heat exchanger, the fourth communication port of the third valve device is in fluidic communication with the fourth valve device and the fourth heat exchanger, and the fifth heat exchanger, the first flow channel of the first heat exchanger, an outlet of the fourth heat exchanger and the inlet of the compressor are connected;

in the third dehumidification mode, the third valve device is in the second working state, the first communication port of the third valve device is in fluidic communication with the fourth communication port of the third valve device, the fourth communication port of the third valve device is in fluidic communication with the first throttling device and the fifth heat exchanger, the fourth communication port of the third valve device is in fluidic communication with the fourth valve device and the fourth heat exchanger, and the fifth heat exchanger, the outlet of the fourth heat exchanger and the inlet of the compressor are connected.

\* \* \* \* \*